United States Patent [19]
Takuma et al.

[11] Patent Number: 6,141,791
[45] Date of Patent: Oct. 31, 2000

[54] DEBUG AID DEVICE, PROGRAM COMPILER DEVICE, STORAGE MEDIUM STORING COMPUTER-READABLE DEBUGGER PROGRAM, AND STORAGE MEDIUM STORING PROGRAM COMPILER PROGRAM

[75] Inventors: Akira Takuma, Kyoto; Shuichi Takayama, Takarazuka, both of Japan

[73] Assignee: Matsushita Electric Industrial Co., Ltd., Osaka, Japan

[21] Appl. No.: 09/143,628

[22] Filed: Aug. 28, 1998

[30] Foreign Application Priority Data

Aug. 29, 1997 [JP] Japan ................................. 9-234355

[51] Int. Cl.[7] .............................. G06F 9/44; G06F 11/00
[52] U.S. Cl. ................................ 717/4; 717/5; 712/227; 714/38
[58] Field of Search ................................ 395/704, 705; 717/4, 5; 714/38, 25; 712/24, 210, 227, 209

[56] References Cited

U.S. PATENT DOCUMENTS

| | | | |
|---|---|---|---|
| 4,694,420 | 9/1987 | Pettet et al. ............................ | 395/705 |
| 5,287,548 | 2/1994 | Flood et al. ............................ | 364/147 |
| 5,450,569 | 9/1995 | Schallier ................................ | 345/353 |
| 5,907,694 | 5/1999 | Suzuki et al. .......................... | 712/210 |

FOREIGN PATENT DOCUMENTS

0899661A1  9/1999  European Pat. Off. .

OTHER PUBLICATIONS

Klug, Hans–Peter, "Microprocessor testing by instruction sequences derived from random patterns," Proceedings of the New Frontiers in Testing, Int'l Test Conf. 1988 IEEE, Sep. 12–14, 1988, pp. 73–80.

Cutler et al., "Microprogrammed computer simulator tools", IEEE Transactions on Education, vol. 33, Issue 2, pp. 212–221, 1990.

Primary Examiner—Tariq R. Hafiz
Assistant Examiner—Tuan A. Dam
Attorney, Agent, or Firm—Price Gess & Ubell

[57] ABSTRACT

On receiving a target address specification from a programmer, an execution code reconversion unit reconverts an operation code of an execution code loaded in the specified address to a mnemonic code. When the execution code includes a subconstant as an operand, a constant restoration unit detects constant division information that shows the subconstant included in the execution code in a debug information storage unit, in order to specify the long-word constant from which the subconstant has been generated. The constant restoration unit then replaces the subconstant with the long-word constant. As a result, the mnemonic code is displayed with the long-word constant.

30 Claims, 27 Drawing Sheets

FIG. 1

```
0012> UX 0x80000000, 0x8000000F
    120 0x8000000 F80012345 sethi  %hi  (0x12345800),%o0
    120 0x8000004 D80000678 or     %o0, 232, %o0
    120 0x8000008 F90000001 sethi  %hi  (0x00001000),%o1
    120 0x800000C C90000000 st     %o0, [%o1 + 0x000]
0013>
```

FIG. 4A

INSTRUCTION FORMAT

| p0.0 | p1.0 | p2.0  p2.1  p2.2 | p3.0  p3.1  p3.2 |
|---|---|---|---|
| 0x0 | 0x0 | 12-BIT SUBCONSTANT SHIFT AND STORE OPERATION (SFST12) | INTER-REGISTER OPERATION |
| 0x0 | 0x1 | 12-BIT SUBCONSTANT SHIFT AND STORE OPERATION (SFST12) | 4-BIT SUBCONSTANT USE OPERATION |
| 0x0 | 0x2 | INTER-REGISTER OPERATION | 12-BIT SUBCONSTANT SHIFT AND STORE OPERATION (SFST12) |
| 0x0 | 0x3 | 4-BIT SUBCONSTANT USE OPERATION | 12-BIT SUBCONSTANT SHIFT AND STORE OPERATION (SFST12) |
| ⋮ 0x0 | 0x8 | (SFST24)  12-BIT SUBCONSTANT SHIFT AND STORE OPERATION | 12-BIT SUBCONSTANT SHIFT AND STORE OPERATION |
| ⋮ 0x6 ⋮ | | 4-BIT SUBCONSTANT USE OPERATION | INTER-REGISTER OPERATION |
| | | 4-BIT SUBCONSTANT  8 BITS | |

FIG. 4B

INTER-REGISTER OPERATION FORMAT

| P2.0/P3.0 | P2.1/P3.1 | P2.2/P3.2 | OPERATION |
|---|---|---|---|
| 0x0 | REGISTER NUMBER(n) | REGISTER NUMBER(m) | ADD Rn,Rm (Rn+Rm—>Rm) |
| 0x1 | REGISTER NUMBER(n) | REGISTER NUMBER(m) | ADDX Rn,Rm (Rn+Rm—>Rx) |
| ... | | | |
| 0x5 | 0 | 0 | NOP (No Operation) |
| .. | | | |

FIG. 4C

4-BIT SUBCONSTANT USE OPERATION FORMAT

| P2.0 / P3.0 | P2.1 / P3.1 | P2.2 / P3.2 | OPERATION |
|---|---|---|---|
| 0x0 | 4-BIT SUBCONSTANT | REGISTER NUMBER(m) | ADD imm4,Rm |
| 0x1 | 4-BIT SUBCONSTANT | REGISTER NUMBER(m) | ADDX imm4,Rm |
| 0x2 | 4-BIT SUBCONSTANT | REGISTER NUMBER(m) | MOV imm4,Rm |
| 0x3 | 4-BIT SUBCONSTANT | REGISTER NUMBER(m) | CMP imm4,Rm |
| 0x4 | 4-BIT SUBCONSTANT | REGISTER NUMBER(m) | SUB imm4,Rm |
| 0x5 | 4-BIT SUBCONSTANT | REGISTER NUMBER(m) | MOVU imm4,Rm |
| .. | | | |
| 0x7 | 4-BIT SUBCONSTANT | REGISTER NUMBER(m) | ST Rm, (imm4) |
| .. | | | |
| 0xA | 4-BIT SUBCONSTANT | REGISTER NUMBER(m) | LD (imm4), Rm |
| .. | | | |

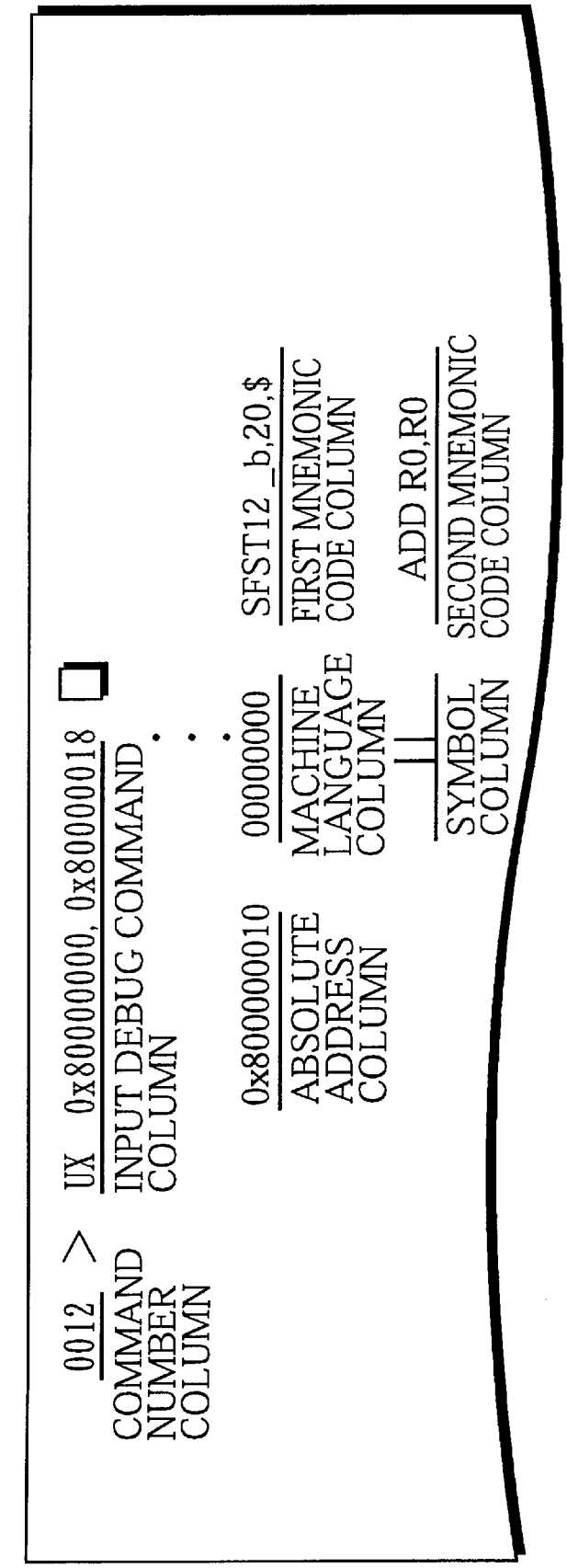

FIG. 7C

SFST24  0x123456

| p0.0 | p1.0 | p2.0 | p2.1 | p2.2 | p3.0 | p3.1 | p3.2 |
|------|------|------|------|------|------|------|------|
| 0x0  | 0x8  | 0x1  | 0x2  | 0x3  | 0x4  | 0x5  | 0x6  |

SFST24

MOV 0x78, R0 || NOP

| p0.0 | p1.0 | p2.0 | p2.1 | p2.2 | p3.0 | p3.1 | p3.2 |
|------|------|------|------|------|------|------|------|
| 0x6  | 0x7  | 0x2  | 0x8  | 0x0  | 0x5  | 0x0  | 0x0  |

0x7?   MOV   0x?8   R0   NOP

FIG. 7E

```
0012> UX 0x80000000, 0x80000018 ☐        DISPLAY
0x80000000   08123456     SFST24  0x123456
0x80000004   67280500     MOV     0x78, R0
                        ||NOP
0x80000008   08000010     SFST24  0x000010
0x8000000C   60700500     ST      R0, (0x00)
                        ||NOP
0x80000010   00000000     SFST12  0x000
                        ||ADD    R0, R0
0x80000014   01010040     SFST12  0x010
                        ||ADD    0x4, R0
0x80000018   60740500     ST      R0, (0x04)
                        ||NOP
0013>
```

FIG. 7F

```
0012> UX 0x80000000, 0x80000018 ☐        DISPLAY
120 0x80000000   08123456     SFST24  0x12345678, 8, $
120 0x80000004   67280500     MOV     0x12345678, R0
120 0x80000008   08000010     SFST24  _a, 8, $
120 0x8000000C   60700500     ST      R0, (_a)
121 0x80000010   00000000     SFST12  _b, 20, $
                            ||ADD    R0, R0
121 0x80000014   01010040     SFST12  _b, 8, 20
                            ||ADD    0x4, R0
121 0x80000018   60740500     ST      R0, (_b)
0013>                       ||NOP
```

FIG. 8A

```
0014>A 0x80000000 ▪                    DISPLAY
```

FIG. 8B

```
0014>A 0x80000000                       DISPLAY
  120   0x80000000  08123456   SFST24  0x12345678, 8, $
                         ?  ▪
```

FIG. 8C

```
0014>A 0x80000000                       DISPLAY
  120   0x80000000  08123456   SFST24  0x12345678, 8, $
                         ?    SFST24  0x87654321, 8, $▪
```

FIG. 8D

```
MEMORY
0x80000000  08123456  →  0x80000000  08876543
0x80000004  67280500  →  0x80000004  62210500
```

FIG. 8E

```
0014>A 0x80000000                       DISPLAY
  120   0x80000000  08123456   SFST24  0x12345678, 8, $
                         ?    SFST24  0x87654321, 8, $
  120   0x80000004  62210500   MOV     0x87654321, R0
                         ?  ▪
```

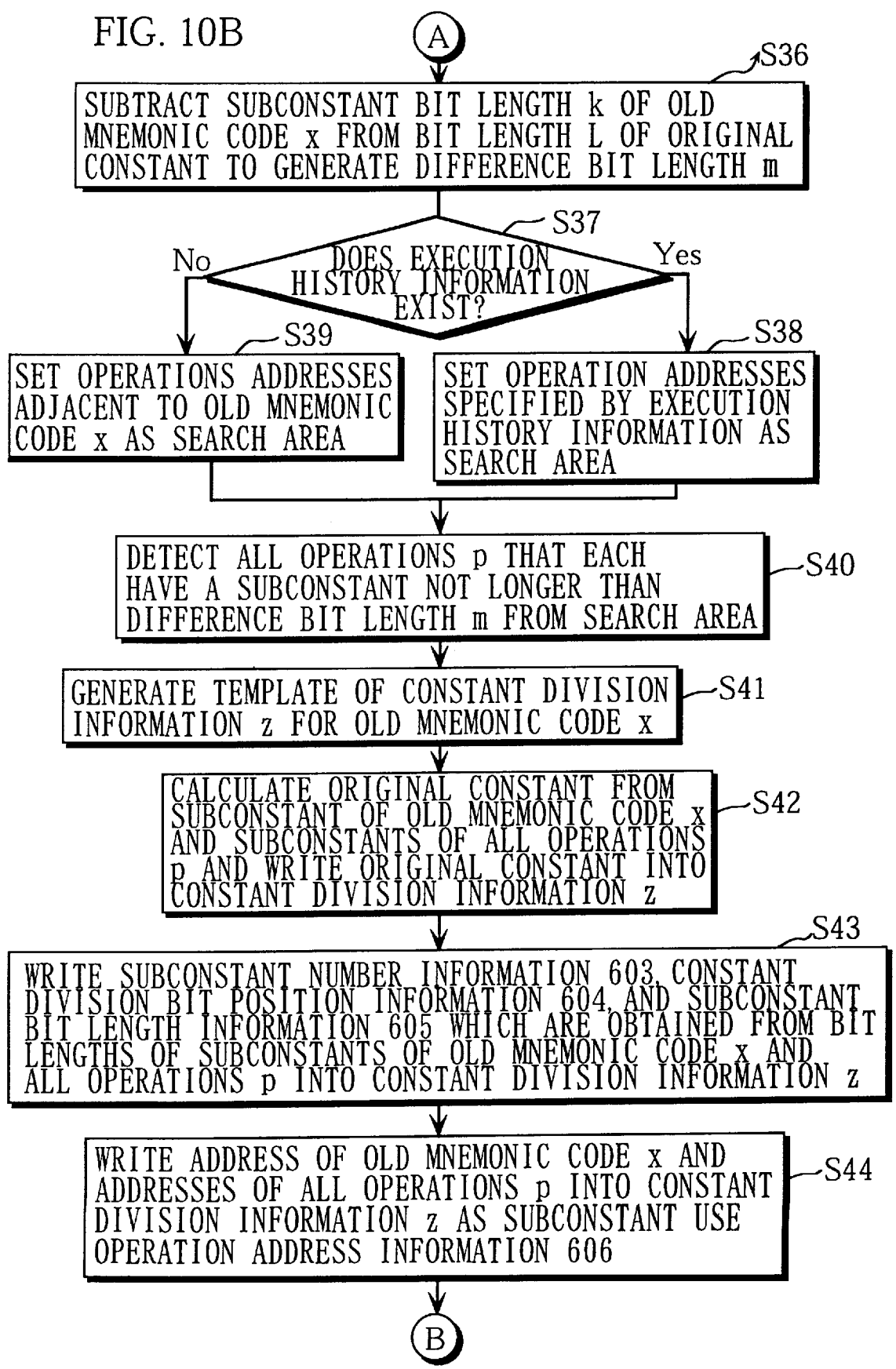

FIG. 12A

SOURCE PROGRAM
a = 0x12345678;
b = a * 2 + 4;

FIG. 12B

INTERMEDIATE DESCRIPTION PROGRAM

```
_DATA    SECTION  DATA
         GLOBAL   _a
_a       DS       4
         GLOBAL   _b
_b       DS       4

_TEXT    SECTION  TEXT
         MOV      0x12345678, R0
         ST       R0, (_a)
         ADD      R0, R0
         ADD      4, R0
         ST       R0, (_b)
```

FIG. 12C

AFTER CONSTANT DIVISION

```
           _DATA    SECTION  DATA
0x0000              GLOBAL   _a
0x0000     _a       DS       4
0x0004              GLOBAL   _b
0x0004     _b       DS       4

_TEXT    SECTION  TEXT
0x0000     SFST24   0x123456, 8, $
0x0004     MOV      0x78, R0
0x0008     SFST24   _a, 8, $
0x000C     ST       R0, (_a)
0x0010     ADD      R0, R0
0x0014     ADD      4, R0
0x0018     SFST24   _b, 8, $
0x001C     ST       R0, (_b)
```

FIG. 12D

AFTER OPTIMIZATION

```
               _DATA     SECTION  DATA
0x0000                   GLOBAL   _a
0x0000    _a             DS       4
0x0004                   GLOBAL   _b
0x0004    _b             DS       4

_TEXT     SECTION  TEXT
0x0000         SFST24    0x123456, 8, $
0x0004         MOV       0x78, R0.
0x0008         SFST24    _a, 8, $
0x000C         ST        R0, (_a)
0x0010         SFST12    _b, 20, $
  ||           ADD       R0, R0
0x0014         SFST12    _b, 8, 20
  ||           ADD       4, R0
0x0018         ST        R0, (_b)
```

FIG. 12E

ABSOLUTE ADDRESS ASSIGNMENT

_TEXT : 0x80000000
_DATA : 0x00001000
_a    : 0x00001000
_b    : 0x00001004

```
j=1
j=2
  j=3    SFSTr1   imm1
  j=4    SFSTr2   imm2
           .         .
           .         .
           .         .
           .         .
  j=9    SFSTr(x-1)  immx-1
  j=10   MOV immx, ~
```

FIG. 15A

AFTER CONSTANT DIVISION
CONSTANT DIVISION INFORMATION 0X12345678

| | |
|---|---|
| 601 CONSTANT TYPE INFORMATION | NUMBER |
| 602 CONSTANT VALUE INFORMATION | 0x12345678 |
| 603 SUBCONSTANT NUMBER INFORMATION | 2 |
| 604 CONSTANT DIVISION BIT POSITION INFORMATION | 8 |
| 605 SUBCONSTANT BIT LENGTH INFORMATION | 24,8 |
| 606 SUBCONSTANT USE OPERATION ADDRESS INFORMATION | 0x0000.0, 0x0004.0 |

FIG. 15B

CONSTANT DIVISION INFORMATION _a

| | |
|---|---|
| 601 CONSTANT TYPE INFORMATION | IDENTIFIER |
| 602 CONSTANT VALUE INFORMATION | _a |
| 603 SUBCONSTANT NUMBER INFORMATION | 2 |
| 604 CONSTANT DIVISION BIT POSITION INFORMATION | 8 |
| 605 SUBCONSTANT BIT LENGTH INFORMATION | 24,8 |
| 606 SUBCONSTANT USE OPERATION ADDRESS INFORMATION | 0x0008.0, 0x000C.0 |

FIG. 15C

| CONSTANT DIVISION INFORMATION_b | |
|---|---|
| 601 CONSTANT TYPE INFORMATION | IDENTIFIER |
| 602 CONSTANT VALUE INFORMATION | _b |
| 603 SUBCONSTANT NUMBER INFORMATION | 2 |
| 604 CONSTANT DIVISION BIT POSITION INFORMATION | 8 |
| 605 SUBCONSTANT BIT LENGTH INFORMATION | 24,8 |
| 606 SUBCONSTANT USE OPERATION ADDRESS INFORMATION | 0x0018.0, 0x001C.0 |

FIG. 16A

CONSTANT DIVISION INFORMATION 0x12345678    AFTER MODIFICATION

| | |
|---|---|
| 601 — CONSTANT TYPE INFORMATION | NUMBER |
| 602 — CONSTANT VALUE INFORMATION | 0x12345678 |
| 603 — SUBCONSTANT NUMBER INFORMATION | 2 |
| 604 — CONSTANT DIVISION BIT POSITION INFORMATION | 8 |
| 605 — SUBCONSTANT BIT LENGTH INFORMATION | 24,8 |
| 606 — SUBCONSTANT USE OPERATION ADDRESS INFORMATION | 0x0000.0, 0x0004.0 |

FIG. 16B

CONSTANT DIVISION INFORMATION_a

| | |
|---|---|
| 601 — CONSTANT TYPE INFORMATION | IDENTIFIER |
| 602 — CONSTANT VALUE INFORMATION | _a |
| 603 — SUBCONSTANT NUMBER INFORMATION | 2 |
| 604 — CONSTANT DIVISION BIT POSITION INFORMATION | 8 |
| 605 — SUBCONSTANT BIT LENGTH INFORMATION | 24,8 |
| 606 — SUBCONSTANT USE OPERATION ADDRESS INFORMATION | 0x0008.0, 0x000C.0 |

FIG. 16C

CONSTANT DIVISION INFORMATION_b

| | IDENTIFIER |
|---|---|
| 601 CONSTANT TYPE INFORMATION | b |
| 602 CONSTANT VALUE INFORMATION | 3 |
| 603 SUBCONSTANT NUMBER INFORMATION | 8,20 |
| 604 CONSTANT DIVISION BIT POSITION INFORMATION | 12,12,8 |
| 605 SUBCONSTANT BIT LENGTH INFORMATION | |
| 606 SUBCONSTANT USE OPERATION ADDRESS INFORMATION | 0x0010.0, 0x0014.1, 0x0018.1 |

FIG. 17A    AFTER ABSOLUTE ADDRESS ASSIGNMENT

CONSTANT DIVISION INFORMATION 0x12345678

| | |
|---|---|
| 601 — CONSTANT TYPE INFORMATION | NUMBER |
| 602 — CONSTANT VALUE INFORMATION | 0x12345678 |
| 603 — SUBCONSTANT NUMBER INFORMATION | 2 |
| 604 — CONSTANT DIVISION BIT POSITION INFORMATION | 8,0 |
| 605 — SUBCONSTANT BIT LENGTH INFORMATION | 24,8 |
| 606 — SUBCONSTANT USE OPERATION ADDRESS INFORMATION | 0x80000000.0, 0x80000004.0 |

FIG. 17B

CONSTANT DIVISION INFORMATION_a

| | |
|---|---|
| 601 — CONSTANT TYPE INFORMATION | IDENTIFIER |
| 602 — CONSTANT VALUE INFORMATION | 0x0000_1000 |
| 603 — SUBCONSTANT NUMBER INFORMATION | 2 |
| 604 — CONSTANT DIVISION BIT POSITION INFORMATION | 8 |
| 605 — SUBCONSTANT BIT LENGTH INFORMATION | 24,8 |
| 606 — SUBCONSTANT USE OPERATION ADDRESS INFORMATION | 0x80000008.0, 0x8000000C.0 |

FIG. 17C

CONSTANT DIVISION INFORMATION_b

| | IDENTIFIER |
|---|---|
| 601 CONSTANT TYPE INFORMATION | |
| 602 CONSTANT VALUE INFORMATION | 0x0000_1004 |
| 603 SUBCONSTANT NUMBER INFORMATION | 3 |
| 604 CONSTANT DIVISION BIT POSITION INFORMATION | 8,20 |
| 605 SUBCONSTANT BIT LENGTH INFORMATION | 12,12,8 |
| 606 SUBCONSTANT USE OPERATION ADDRESS INFORMATION | 0x80000010.0, 0x80000014.1, 0x80000018.1 |

DEBUG AID DEVICE, PROGRAM COMPILER DEVICE, STORAGE MEDIUM STORING COMPUTER-READABLE DEBUGGER PROGRAM, AND STORAGE MEDIUM STORING PROGRAM COMPILER PROGRAM

This application is based on an application No. 9-234355 filed in Japan, the content of which is hereby incorporated by reference.

BACKGROUND OF THE INVENTION

1. Field of the Invention

The present invention relates to a debug aid device for testing an execution code sequence and fixing bugs and to a program compiler device for generating the execution code sequence to be processed by the debug aid device.

2. Description of the Prior Art

Microcomputer systems are essential for electronic equipment today. Especially, programs developed for use in household electrical appliances have to achieve the level of quality required for mass production and thus need to be throughly debugged. Hence debug aid devices have become profoundly important when developing programs.

The debug aid devices are mainly classified into three types. The first type operates a debug target program in a target machine ROM. The second type operates the debug target program on an ICE (In-Circuit Emulator) board (trademark). The third type operates the debug target program in simulation using a simulator in a host computer.

These debug aid devices each run and stop the debug target program stored in the target machine at given addresses. Programmers can see the process of correcting values of the of memory and registers on the host computer display. Also, by temporarily changing parameters in the debug target program before running it, the programmers can examine the operation of the debug target program in various circumstances. By using the debug aid devices as described above, the programmers can find and diagnose bugs in the debug target program.

To debug variables or subroutines stored in the debug target program, a programmer specifies execution codes expressed by hexadecimal values as the debug target since the variables and the subroutines are written in execution codes in the debug target program. Accordingly, the debug aid devices should be able to restore mnemonic codes which resembles source codes from the specified hexadecimal values (hereinafter, binary data) in order to simplify the debugging.

A debug aid device with the above restoring capacity can convert specified execution codes in the target machine memory to mnemonic codes that can easily be understood by the programmer. Also, the programmer can specify the start and stop addresses of the debug target program by subroutine names written in the source program, and not actual addresses in the target machine memory. Equally, the programmer can specify program variables to be debugged by variable names written in the source program, and not actual addresses in the target machine memory.

However, with the conventional debug aid devices, it is difficult to debug an execution code that corresponds to a section of a source program that includes a long-word constant, since statements including a long-word constant in the source program correspond to a plurality of execution codes in the debug target program.

More specifically, when the source program includes a statement with a long-word constant, a program compiler device does not compile the statement to create an execution code that includes the long-word constant. Instead, the long-word constant in the statement is first divided into a plurality of subconstants and the statement is compiled to a plurality of execution codes which use the plurality of subconstants as operands.

When converting the plurality of execution codes generated as such to a plurality of mnemonic codes in the debug stage, the programmer may be confused on finding a plurality of strange operands in the mnemonic codes, instead of the long-word constant which was originally written in the source program.

Also, when the programmer tries to identify the original long-word constant from execution codes which include a plurality of subconstants generated from the long-word constant, the programmer may confuse these subconstants with other subconstants generated from a different long-word constant.

Also, when temporarily changing a long-word constant in the debug target program, the programmer needs to control the target machine to read a plurality of execution codes that include the plurality of subconstants from the memory so as to identify the long-word constant to be changed. This requires a considerable amount of processing time. The programmer also needs to know at which bit position the original long-word constant has been divided. Because of these difficulties, the programmer often gives up changing long-word constants in the debug stage.

In debug processing, the instruction length in the debug target program is fixed so that the processor executes instructions at high speed. For example, processors equipped in SPARC (Scalable Processor ARChitecture) work stations developed by Sun Microsystems Inc. use the 32-bit fixed instruction length. Each 32-bit constant included in source programs developed for use in these processors is first divided into two subconstants of the high-order bits and the low-order bits and then compiled to two execution codes.

FIG. 1 shows a result of executing a reconversion command on four execution codes written in addresses 0x80000000 to 0x8000000F using a SPARC processor. In the figure, the four execution codes express an instruction for assigning a constant "0x12345A32" to variable a stored in address 0x00001000. As shown in the figure, a debug command is inputted for displaying a list from "sethi %hi (0x12345800),%o0" to "st %o0,[%o1+0x000]". The columns from left to right show line numbers corresponding to the source program, execution code addresses, execution codes in machine language, and mnemonic codes as the reconversion results.

The mnemonic code "sethi %hi(0x12345800),%o0" shows an instruction for storing high-order 22 bits of the constant "0x12345A32" into register %o0. The mnemonic code "or %o0,232,%o0" shows an instruction for performing an OR operation on the value of register %o0 and a constant operand "232" and storing the operation result into register %o0. The mnemonic code "sethi %hi(0x00001000), %o1" shows an instruction for storing a constant "0x00001000" into register %o1. The mnemonic code "st %o0,[%o1+0x000]" shows an instruction for storing the value of register %o0 into an address specified by the value of register %o1 and a constant operand "0x000".

Among the above instructions, "sethi %hi(0x12345800), %o0" and "or %o0,232,%o0" respectively include a 22-bit subconstant "0x12345800" and a 10-bit subconstant "0×232". This indicates that the 32-bit constant "0×12345A32" originally written in the source program has been divided into the two subconstants and then loaded into the target machine memory, since it matches the fixed instruction length specified for the processor. In the same way, "sethi %hi(0×00001000),%o1" and "st %o0,[%o1+0× 000]" show that address 0×00001000 of variable a has been divided into the two subconstants before being loaded into the memory.

If the programmer knows that each 32-bit constant in the source program has been divided into the high-order 22 bits and the low-order 10 bits, it is not impossible to detect the original constant corresponding to the mnemonic code "sethi %hi(0×12345800),%o0" and "or %o0,232,%o0". However, when 32-bit constants are divided according to a plurality of division patterns, such as "4, 4, 4, 20" and "8, 24", it is more difficult and time-consuming to detect the original constant.

SUMMARY OF THE INVENTION

The first object of the present invention is to provide a debug aid device that solves the difficulties experienced by the programmer when reconverting execution codes which includes subconstants.

The second object of the present invention is to provide a debug aid device that solves the difficulties in debug processing by preventing the programmer from confusing subconstants generated from one long-word constant with subconstants generated from other another long-word constants.

The third object of the present invention is to provide a debug aid device that enables the programmer to temporarily change long-word constants without difficulty.

The fourth object of the present invention is to provide a program compiler device for generating a debug target program and debug information that enables the programmer to debug the debug target program more smoothly.

The first and second objects can be fulfilled by a debug aid device for supporting a debugging of an execution code sequence loaded in a memory, including: a reception unit for receiving a specification of a debug target address from a user; a conversion unit for converting an operation code in an execution code loaded in the debug target address in the memory to a mnemonic code; a judging unit for judging, when the execution code includes a constant operand, whether the constant operand is a subconstant obtained by dividing a long-word constant; a restoration unit for restoring the long-word constant from the constant operand when the constant operand is the subconstant; and a display unit for displaying the mnemonic code with the long-word constant.

With the stated construction, when an execution code includes one of a plurality of subconstants generated from one long-word constant, first the long-word constant is restored from the subconstant and then the subconstant is replaced with the long-word constant. Accordingly, the mnemonic code is displayed with the long-word constant which was originally written in the source program by the programmer.

Thus, the programmer can smoothly perform debugging since the long-word constant originally written in the source program is displayed instead of the plurality of subconstants. Also, the programmer will not confuse the plurality of subconstants with other subconstants generated from a different long-word constant. The third object can be fulfilled by the debug aid device, wherein the reception unit includes a change command reception unit for receiving a command for changing a long-word constant in the memory and a new long-word constant from the user, and wherein the debug aid device further includes: a division unit for dividing the new long-word constant into a plurality of new subconstants according to the bit position information in a set of constant division information that shows the long-word constant to be changed; and a write unit for writing each of the plurality of new subconstants into a corresponding load address shown in the set of constant division information.

With the stated construction, it is possible to temporarily change the long-word constant without reading a plurality of execution codes that include the plurality of subconstants from the memory. Accordingly, the processing time can be reduced and the programmer can change the long-word constant without difficulty.

Here, each set of constant division information may also include type information for showing whether the long-word constant is expressed as a number or an identifier which identifies the long-word constant in the source code sequence and shows one of the number and the identifier according to the type information, wherein the display unit includes: a judgement unit for judging, when the constant operand is the subconstant, whether the long-word constant is expressed as a number or an identifier in the source code sequence with reference to the type information in the set of constant division information that shows the subconstant; a first display unit for displaying the identifier shown in the set of constant division information when the long-word constant is expressed as the identifier; and a second display unit for displaying the number shown in the set of constant division information when the long-word constant is expressed as the number.

With the stated construction, it is possible to specify whether the long-word constant has been written as the number or the identifier in the debug stage.

Here, the restoration unit may include: a bit length calculation unit for calculating a difference bit length by subtracting a bit length of the constant operand included in the execution code from a standard bit length of the long-word constant; an execution code detection unit for detecting at least one constant operand that has a bit length no more than the difference bit length from addresses adjacent to the debug target address; and an arrangement unit for arranging the detected constant operand and the constant operand included in the debug target address to restore the long-word constant.

With the stated construction, the long-word constant can be restored even when the constant division information does not exist.

Here, the debug aid device may further include an execution history storage unit for storing, when at least one execution code loaded in the memory has been executed, addresses of the executed execution code, wherein, when no execution code has been executed, the execution code detection unit detects the constant operand from the addresses adjacent to the debug target address, and wherein, when at least one execution code has been executed, the execution code detection unit detects the constant operand from the addresses stored in the execution history storage unit and from the addresses adjacent to the debug target address.

With the stated construction, when a conditional branch instruction which leads to either of two routes each including a subconstant shift and store operation is included in the debug target program, it is possible to specify which subconstant shift and store operation has been executed by referring to the execution history storage unit. Accordingly, the long-word constant can be correctly restored. Here, the debug aid device may further include: a constant division information storage unit for storing a plurality of sets of constant division information, wherein each set of constant division information shows: one of a plurality of long-word constants written in a source code sequence which has been compiled to the execution code sequence; subconstant information showing a plurality of subconstants obtained by dividing the long-word constant; and a load address of each execution code that includes one of the plurality of subconstants when the load address is known; and a constant division information generation unit for generating, when the long-word constant is restored by the arrangement unit, a set of constant division information by writing the restored long-word constant as an original long-word constant, writing the detected constant operand and the constant operand included in the debug target address as the subconstant information, and writing the debug target address and an address of the detected constant operand as load addresses, wherein the generated set of constant division information is stored into the constant division information storage unit.

With the stated construction, once the constant division information is generated, it is no longer necessary to read execution codes and refer to the execution history information in order to restore the long-word constant next time. Also, the long-word constant can be restored even when the execution history information is deleted from the execution history storage unit.

The fourth object of the present invention is fulfilled by a program compiler device, including: a reception unit for receiving a command for compiling a source code sequence from a user; a compilation unit for compiling the source code sequence to an execution code sequence when the command for compiling the source code sequence is received, wherein, among all instructions written in the source code sequence, each instruction that includes a long-word constant is replaced with an operation sequence in the execution code sequence, the operation sequence being made up of a plurality of operations that respectively include a plurality of subconstants obtained by dividing the long-word constant; a judgement unit for judging whether the command for compiling the source code sequence is accompanied with a debug option specification; and a generation unit for generating constant division information for specifying the long-word constant using the plurality of subconstants when the debug option specification is accompanied.

With the stated construction, the constant division information provides detailed information on the relation between the original constant in the source program and the plurality of subconstants in the debug target program. Accordingly, the debugging can be efficiently performed using the constant division information. Here, the constant division information may include a load address column showing a load address of each of the plurality of operations that respectively include the plurality of subconstants, wherein the compilation unit includes: a replacement unit for replacing each instruction that includes the long-word constant with the operation sequence made up of the plurality of operations; an optimization unit for optimizing the source code sequence in which each instruction has been replaced with the operation sequence; and an assignment unit for assigning a load address in a target machine to each of the plurality of operations in the optimized source code sequence, and wherein the generation unit includes: a write unit for calculating, after each instruction is replaced with the operation sequence, a relative address of each operation included in the operation sequence and writing the relative address into the load address column in the constant division information; and a renewal unit for renewing the relative address according to a change of the relative address as a result of an optimization by the optimization unit, calculating a load address from the renewed relative address and the assigned load address, and writing the calculated load address into the load address column in the constant division information.

With the stated construction, when the program compiler device first divides the long-word constant and then adds further modifications to optimize the debug target program, the debug aid device can restore the long-word constant by referring to the constant division information that has been renewed corresponding to the optimization result.

BRIEF DESCRIPTION OF THE DRAWINGS

These and other objects, advantages and features of the invention will become apparent from the following description thereof taken in conjunction with the accompanying drawings that illustrate a specific embodiment of the invention. In the drawings:

FIG. 1 shows how execution codes are converted to mnemonic codes in the conventional debugging;

FIG. 4A shows the instruction formats of the VLIW processor 22;

FIG. 4B shows the inter-register operation formats;

FIG. 4C shows the 4-bit subconstant use operation formats;

Figure 9:
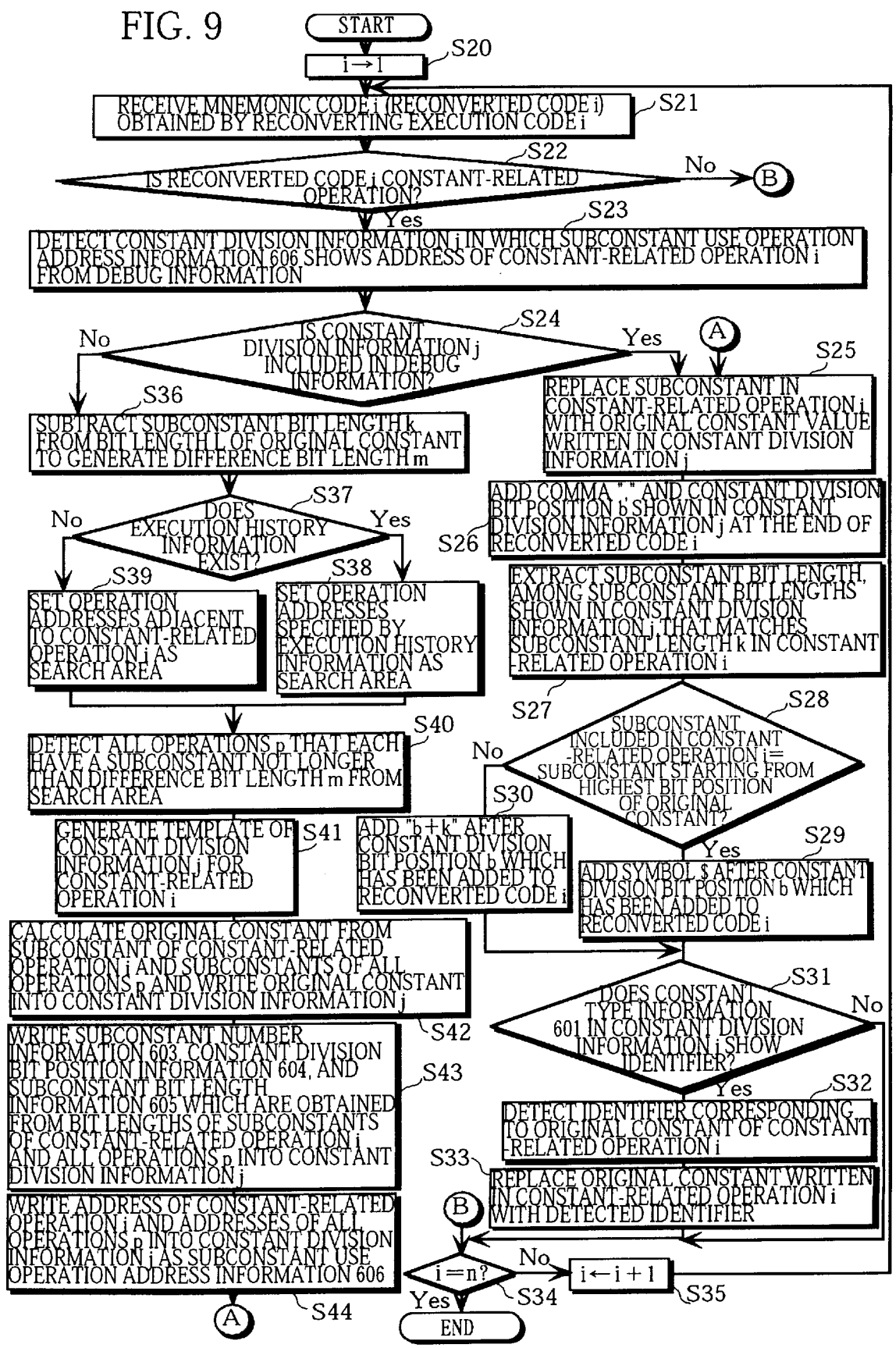
Figure 10A:
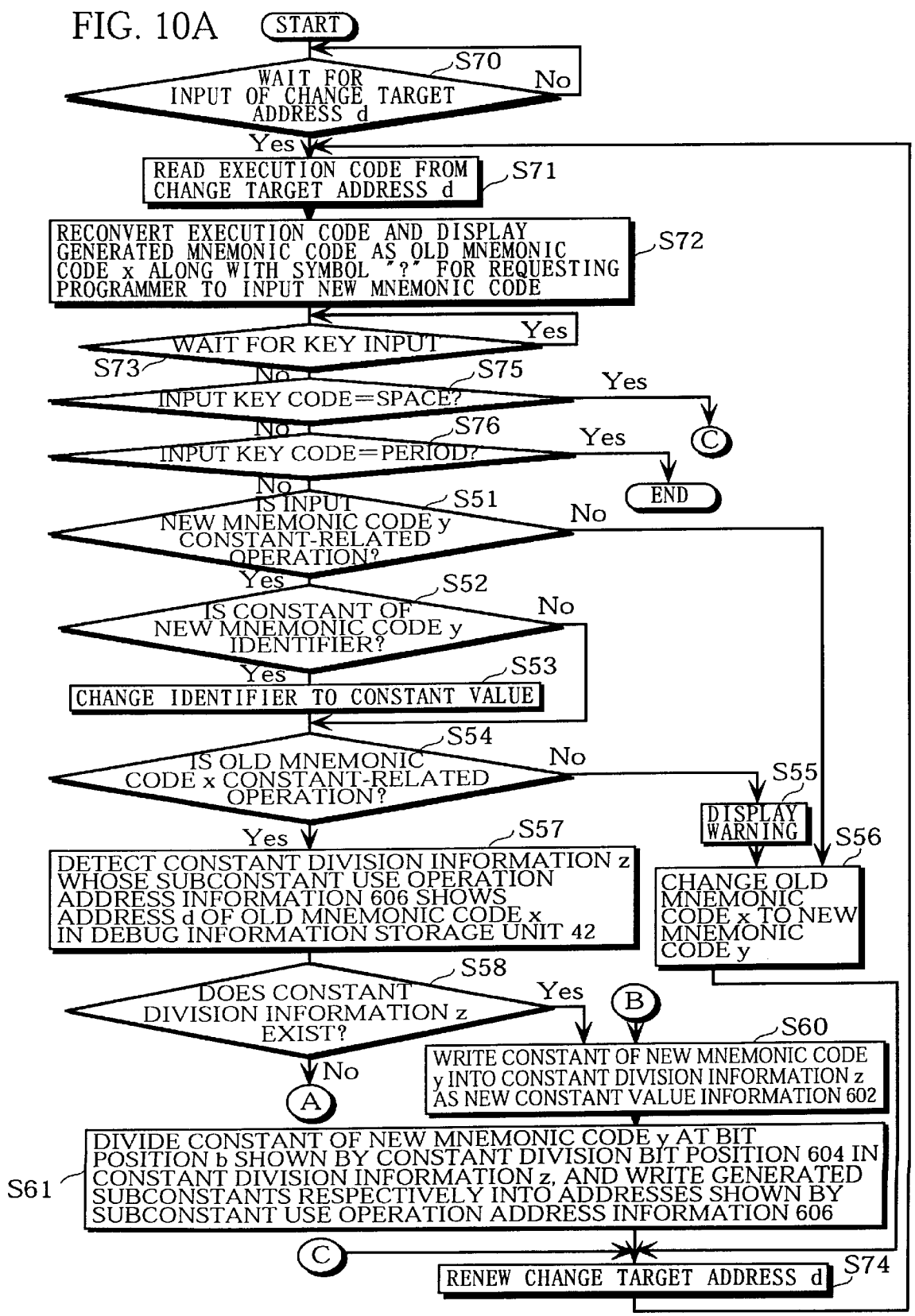
Figure 11:
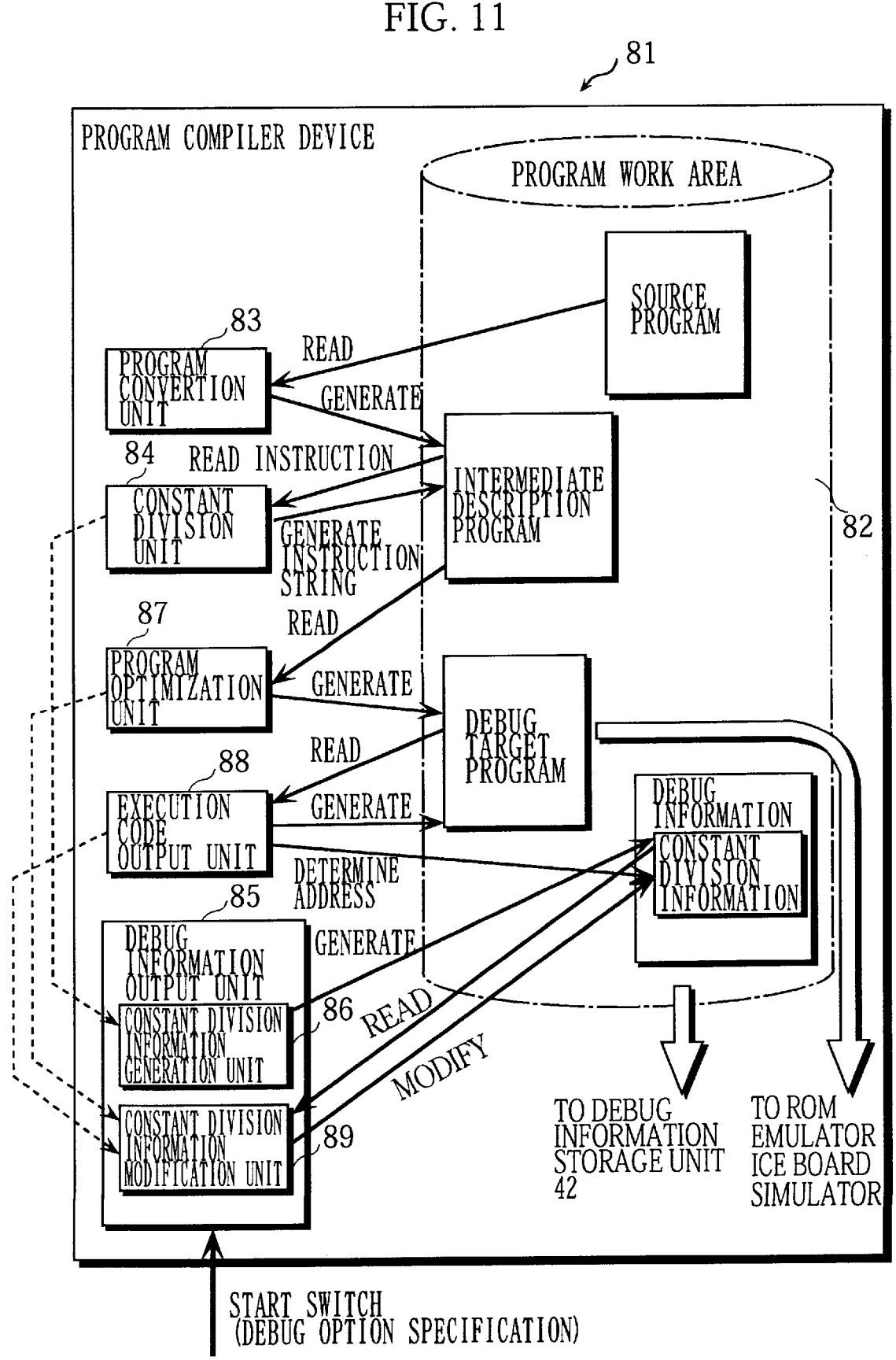
Figure 13:
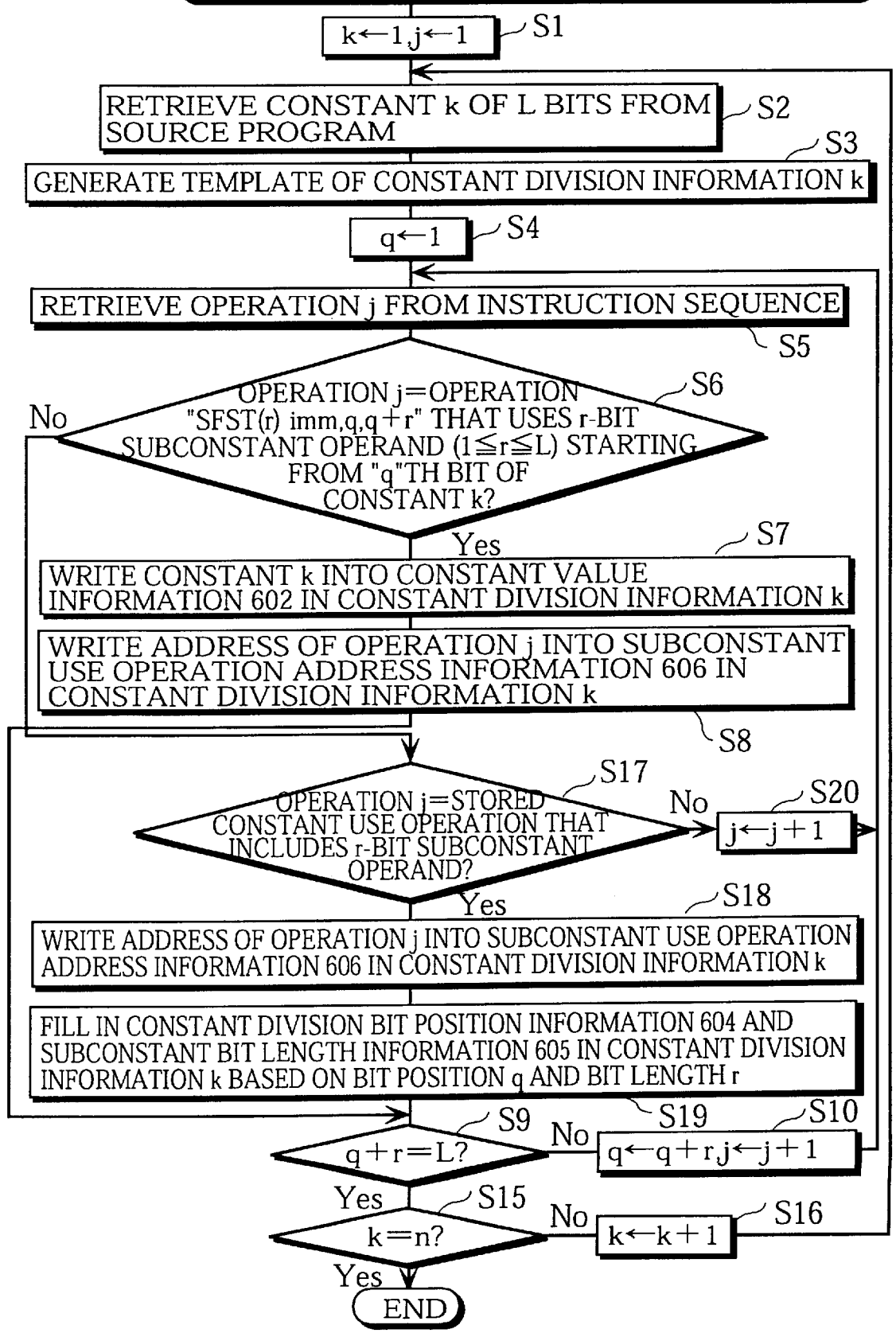
Figures 14A, 14B:
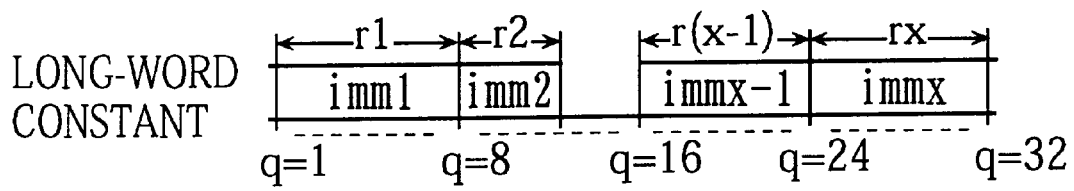

FIG. .6 shows the debug information and the constant division information included in the debug information;

FIG. 7A shows the dialog display displayed on the display 11 according to the processing of the user interface 44;

FIGS. 7B–7F show the process of reconverting execution codes by the execution code reconversion unit 47;

FIGS. 8A–8E show the processing of the constant change unit 50 when executing the change command;

FIG. 9 is a flowchart showing the processing of the constant restoration unit 49;

FIGS. 10A and 10B are a flowchart showing the processing of the constant change unit 50;

FIG. 11 shows the internal construction of the program compiler device 81;

FIG. 12A shows an example of the source program;

FIG. 12B shows an example of the intermediate description program;

FIG. 12C shows an example of the intermediate description program after dividing the long-word constants;

FIG. 12D shows an example of the intermediate description program after optimization;

FIG. 12E shows absolute addresses assigned to the debug target program;

FIG. 13 is a flowchart showing the processing of generating the constant division information;

FIGS. 14A and 14B show examples of operations and a long-word constant written with the variables shown in FIG. 13;

FIGS. 15A–15C show examples of the constant division information after dividing the long-word constants;

FIGS. 16A–16C show examples of the constant division information after modification; and FIGS. 17A–17C show examples of the constant division information after absolute address assignment.

DESCRIPTION OF THE PREFERRED EMBODIMENT

Hardware Environment for Debug Aid Device and Program Compiler Device

The following is an explanation of the debug aid device and the program compiler device of the embodiment of the present invention.

Figure 2A:
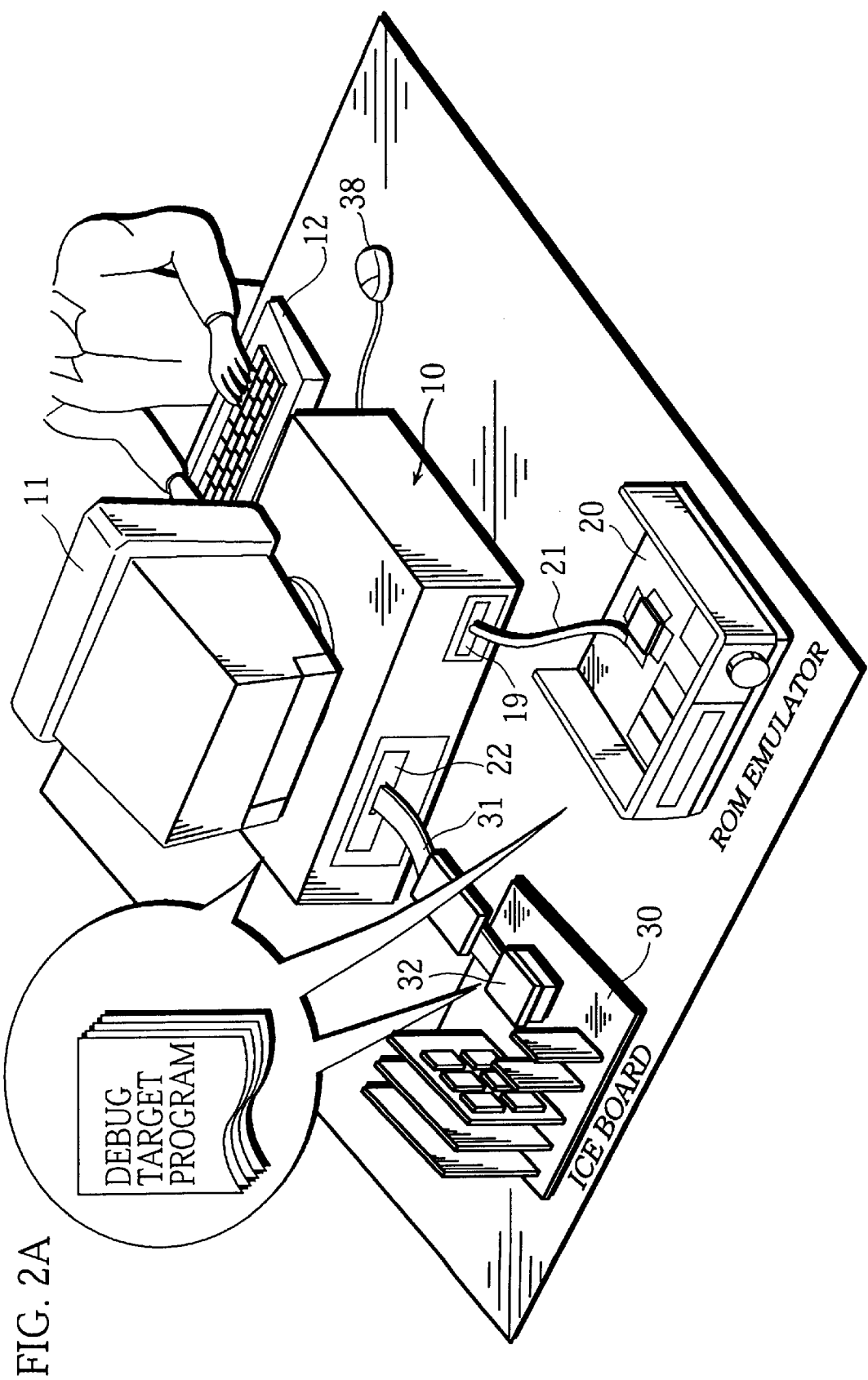
FIG. 2A shows the appearance of the hardware environment of the embodiment of the present invention.
Figure 2B:
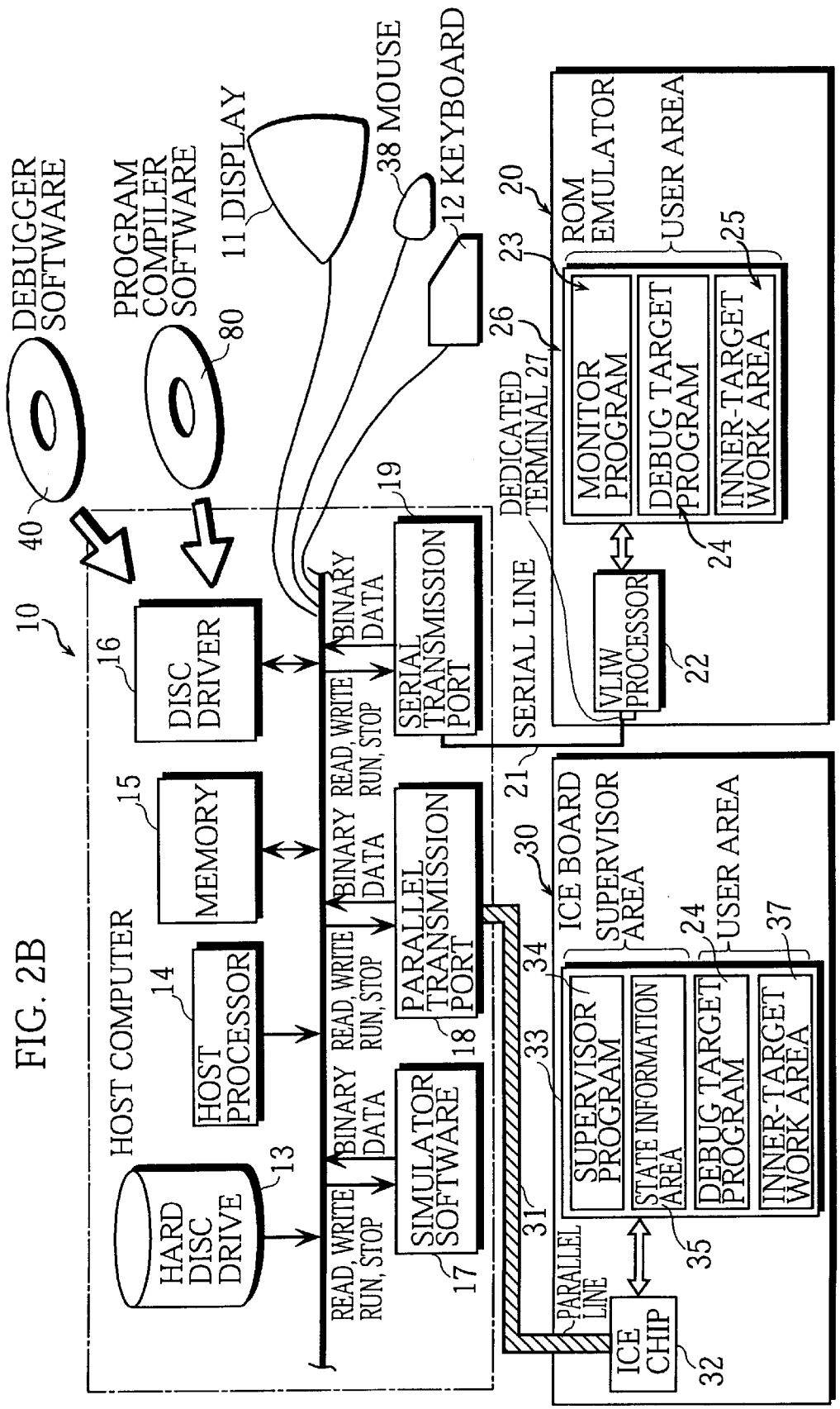
FIG. 2B shows the internal construction of the hardware environment of the embodiment.

FIG. 2A shows the hardware environment required for the operation of the debug aid device and the program compiler device, while FIG. 2B is a block diagram of the hardware environment shown in FIG. 2A.

In FIG. 2A, a host computer 10 is connected to a display 11, a keyboard 12, and a mouse 38. In FIG. 2B, the host computer 10 includes a hard disc drive 13, a host processor 14, a memory 15, a disc driver 16, a simulator software 17, a parallel transmission port 18, and a serial transmission port 19. The parallel transmission port 18 and the serial transmission port 19 are respectively connected to an ICE board 30 and a ROM emulator 20 via a parallel line 31 and a serial line 21.

The host computer 10 operates as a debug aid device when a storage medium 40 storing a debugger software is loaded into the disc driver 16 and the debugger software is installed in the hard disc drive 13 and activated. Also, the host computer 10 operates as a program compiler device when a storage medium 80 storing a program compiler software is loaded into the disc driver 16 and the program compiler software is installed in the hard disc drive 13 and activated.

The ROM emulator 20 runs and stops a debug target program 24 according to instructions sent from the host computer 10 via the serial line 21. The ROM emulator 20 also reads/writes values from/into a memory 26 when the debug target program 24 is in a stopped state.

As shown in FIG. 2B, the ROM emulator 20 includes a VLIW processor 22 and the memory 26. The memory 26 has a user area which includes a monitor program 23, the debug target program 24, and an inner-target work area 25.

The VLIW processor 22 executes each instruction written in instruction sequences which compose the monitor program 23 and the debug target program 24 and is equipped with a dedicated terminal 27 which is connected to the serial line 21.

The debug target program 24 is composed of instruction sequences that include a plurality of monitor instructions. A monitor instruction is used to instruct the VLIW processor 22 to branch from the debug target program 24 to the monitor program 23 when data is inputted in the dedicated terminal 27.

The monitor program 23 is activated when a branch is executed according to the monitor instruction. In accordance with the monitor program 23, the VLIW processor 22 is set into a waiting state for a command input. When the command is inputted in the dedicated terminal 27, the VLIW processor 22 executes the command according to the monitor program 23.

The inner-target work area 25 is used for the operation of the monitor program 23 and the debug target program 24.

The ICE board 30 runs and stops the debug target program 24 in the same way as the ROM emulator 20 in accordance with instructions sent from the host computer 10 via the parallel line 31. The ICE board 30 also reads/writes values from/into a memory 33 at desired timing according to the control by the host computer 10.

As shown in FIG. 2B, the ICE board 30 includes an ICE chip 32 and the memory 33. The memory 33 has a supervisor area including a supervisor program 34 and a state information area 35, and a user area including the debug target program 24 and an inner-target work area 37.

The ICE chip 32 performs the same processing as the VLIW processor 22 according to instructions sent from the host computer 10 via the parallel line 31.

The supervisor program 34 includes a breakpoint setting tool for setting breakpoints, a trace tool for storing an address of each operation executed by the ICE chip 32 as execution history information, and an interrupt setting tool for monitoring whether a predetermined condition set by the programmer is satisfied and generating an interrupt signal when the condition is satisfied.

The state information area 35 is a memory area used as a work area for the supervisor program 34 and stores addresses of the set breakpoints, breakpoint information showing whether an operation is to be performed at each breakpoint, the execution history information showing addresses of executed operations in the debug target program 24, and interrupt signal generation condition information showing the predetermined condition set by the programmer for generating the interrupt signal.

The inner-target work area 37 is used for the operation of the debug target program 24.

The simulator software 17 has the host processor 14 simulate the VLIW processor 22. In the simulation, the memory 15 stores the supervisor program 34, the state information area 35, the debug target program 24, and the inner-target work area 37 the same as the memory 33 in the ICE board 30. The simulator software 17 runs and stops the debug target program 24 according to instructions from the display 11 and the keyboard 12. The simulator software 17 also reads/writes values from/into the memory 15 at desired timing according to instructions from the display 11 and the keyboard 12.

In the debug aid device, any of the simulator software 17, the ROM emulator 20, and the ICE board 30 can be used to test the debug target program 24. However, the simulator software 17, the ROM emulator 20, and the ICE board 30 each have the following advantages and disadvantages. Accordingly, the programmer needs to select the most appropriate one according to a type of debugging, with consideration for those advantages and disadvantages.

Since the ROM emulator 20 is made principally for monitoring the debug target program 24, it is suitable for performing relatively simple checking and debugging of a target machine trial model. On the other hand, the ROM emulator 20 is not suitable for complex debugging, since the memory 26 does not store the breakpoint setting tool, the trace tool, and the interrupt setting tool.

Since the ICE board 30 has the breakpoint setting tool, the trace tool, and the interrupt setting tool in the supervisor program 34, it is capable of performing the complex debugging using these tools. On the other hand, as the ICE board 30 has a circuit construction different from the target machine, its debugging cannot be regarded as complete even if the debug target program appears working normally as a result of the debugging by the ICE board 30. Also, wiring on the ICE board 30 is sometimes longer than the target machine itself, which tends to cause a time lag between circuit elements.

The simulator software 17 has the breakpoint setting tool, the trace tool, and the interrupt setting tool in the memory 15 as does the ICE board 30. Accordingly, it is capable of performing the complex debugging using these tools. On the other hand, since the simulator software 17 operates in the host computer 10, the operation of the debug target program 24 in the host computer 10 is much slower than the ROM emulator 20 and the ICE board 30. For instance, the same processing takes several minutes or more in the host computer 10, while it only takes one second in the ROM emulator 20 or the ICE board 30.

Instruction Format

The following is an explanation of instructions that compose the debug target program 24.

The instructions that compose the debug target program 24 each have 32 bits and can include three operations at the maximum, which can be processed by the VLIW processor 22 in parallel. In this specification, the expression "instruction" refers to a set of codes that are executed by the VLIW processor simultaneously and in parallel, while the expression "operation" refers to a unit of processing, such as an arithmetic operation, a logic operation, or a transfer, which is executed by the VLIW processor 22 in parallel, as well as to a code that indicates each unit of processing.

In order to make the best possible use of the parallel processing capability of the VLIW processor 22, constant division processing and scheduling processing are performed on the debug target program 24 during compilation. As a result, the following changes from the intermediate description program are seen in the debug target program 24.

The first change is that each instruction which includes a long-word constant of 32 bits or 24 bits among instructions in the intermediate description program is converted into at least one subconstant shift and store operation and a stored constant use operation.

The subconstant shift and store operation has one subconstant as an operand, out of k subconstants generated by dividing a long-word constant included in one instruction in the intermediate description program. When the long-word constant is divided into the k subconstants, (k-1) subconstant shift and store operations are written in the debug target program 24.

The stored constant use operation has the lowest-order subconstant, among the k subconstants, as an operand and specifies an operation, such as an arithmetic operation, a logic operation, or a transfer, to be executed by the VLIW processor 22.

The following is an explanation on how subconstants are stored according to the subconstant shift and store operations and how the stored subconstants are used according to the stored constant use operation.

The VLIW processor 22 decodes the first subconstant shift and store operation and stores a subconstant included in the first subconstant shift and store operation into a constant register 76 that is a dedicated register included in the VLIW processor 22.

Next, the VLIW processor 22 decodes the second subconstant shift and store operation, has the constant register 76 shift the stored subconstant to the higher position, and stores a subconstant included in the second subconstant shift and store operation into the lowest position in the constant register 76.

The above processing is repeated for the other subconstant shift and store operations. On decoding all of the plurality of subconstant shift and store operations, the VLIW processor 22 decodes the stored constant use operation and has the constant register 76 shift all subconstants stored in the above processing to the higher position. The VLIW processor 22 then stores a subconstant included in the stored constant use operation into the lowest position in the constant register 76 and performs an operation specified by the stored constant use operation, such as an arithmetic operation, a logic operation, or a transfer, using all subconstants stored in the constant register 76.

The second change is that the instruction execution order in the debug target program 24 is different from that of the intermediate description program set by the programmer, since the scheduling has been performed when compiling the intermediate description program. Here, each instruction that composes the debug target program 24 is a 32-bit long-word instruction which includes three operations at the maximum. Thus, each instruction written in the intermediate description program is converted to operations at the time of the compilation and the generated operations in units of three at the maximum are packaged into one long-word instruction in the debug target program 24.

In the scheduling, the operation execution order is changed so as to efficiently supply operation sequences to a plurality of execution units in the VLIW processor 22, and operations which can be executed in one cycle are packed into the same instruction.

As a result of the constant division processing and the scheduling processing described above, each instruction that has a long-word constant in the source program is divided into a plurality of operations each having a subconstant, which are then packed into 32-bit instructions without leaving a gap. By doing so, a size of the debug target program 24 is reduced.

Instruction formats of the debug target program 24 are defined so that each instruction includes a plurality of operations corresponding to the subconstant shift and store operations and/or the stored constant use operations. The instruction formats are shown in FIG. 4A.

In the figure, each 32-bit instruction is divided into eight 4-bit fields which are from the highest expressed as p0.0, p1.0, p2.0, p2.1, p2.2, p3.0, p3.1, and p3.2.

When p0.0 and p1.0 which correspond to the highest 8 bits of a 32-bit instruction are both set at "0x0", a subconstant shift and store operation with a 12-bit subconstant operand (the operation code is "SFST12" in mnemonic code) is set in p2.0–p2.2 (first operation field), and an inter-register operation is set in p3.0–p3.2 (second operation field). kit When p0.0 and p1.0 are respectively set at "0x0" and "0x1", a subconstant shift and store operation with a 12-bit subconstant operand is set in the first operation field, and an operation be using a 4-bit subconstant operand is set in the second operation field.

When p0.0 and p1.0 are respectively set at "0x0" and "0x2", an inter-register operation is set in the first operation field, and a subconstant shift and store operation with a 12-bit subconstant operand is set in the second operation field.

When p0.0 and p1.0 are respectively set at "0x0" and "0x3", an operation using a 4-bit subconstant operand is set in the first operation field, and a subconstant shift and store operation with a 12-bit subconstant operand is set in the second operation field.

When p0.0 and p1.0 are respectively set at "0x0" and "0x8", a subconstant shift and store operation with a 12-bit subconstant operand is set in the first operation field, and a subconstant shift and store operation with a 12-bit subconstant operand is set in the second operation field (the operation code is "SFST24" in mnemonic code).

The first operation field and the second operation field can each have a subconstant operand of either 4 or 12 bits.

Accordingly, the first and second operation fields can include subconstants of 24 bits (12+12) or 16 bits (4+12 or 12+4). Also, the first operation field and the p1.0 field can include subconstants of 8 bits. That is to say, one instruction has subconstants that are 4 bits, 8 bits (4+4), 12 bits, 16 bits (4+12), or 24 bits (12+12) long. Thus, operations are combined to form a constant of various length.

When a combination exceeds 32 bits, such as the combination of three 12-bit subconstants (36 bits), excess high-order bits are ignored. On the other hand, when the combination does not reach 32 bits, sign extension or zero extension is performed on the combination according to each operation type.

FIG. 4B shows the instruction formats of the first operation field or the second operation field when an inter-register operation is set in the first or second operation field.

When p2.0 (p3.0) is set at "0×0", register numbers (n) and (m) of a general register 75 in the VLIW processor 22 are set respectively in p2.1 (p3.1) and p2.2 (p3.2). Here, the operation expressed by the mnemonic code "ADD Rn,Rm" is to instruct the VLIW processor 22 to add values of registers Rn and Rm and transfer the addition result to register Rm.

When p2.0 (p3.0) is set at "0×1", register numbers (n) and (m) are set respectively in p2.1 (p3.1) and p2.2 (p3.2). Here, the operation expressed by the mnemonic code "ADDX Rn,Rm" is to instruct the VLIW processor 22 to add values of registers Rn and Rm and transfer the addition result to register Rx.

When p2.0 (p3.0) is set at "0×5", no operation is specified (mnemonic code "NOP").

FIG. 4C shows the instruction formats of the first (second) operation field when a 4-bit subconstant use operation is set in the first (second) operation field.

When p2.0 (p3.0) is set at "0×0", a 4-bit subconstant is set in p2.1 (p3.1), and a register number (m) is set in p2.2 (p3.2). Here, the operation is expressed by the mnemonic code "ADD imm4,Rm".

When p2.0 (p3.0) is set at "0×1", a 4-bit subconstant is set in p2.1 (p3.1), and a register number (m) is set in p2.2 (p3.2). Here, the operation is expressed by the mnemonic code "ADDX imm4,Rm".

When p2.0 (p3.0) is set at "0×2", a 4-bit subconstant is set in p2.1 (p3.1), and a register number (m) is set in p2.2 (p3.2). Here, the operation is expressed by the mnemonic code "MOV imm4,Rm".

When p2.0 (p3.0) is set at "0×3", a 4-bit subconstant is set in p2.1 (p3.1), and a register number (m) is set in p2.2 (p3.2). Here, the operation is expressed by the mnemonic code "CMP imm4,Rm".

When p2.0 (p3.0) is set at "0×4", a 4-bit subconstant is set in p2.1 (p3.1), and a register number (m) is set in p2.2 (p3.2). Here, the operation is expressed by the mnemonic code "SUB imm4,Rm".

When p2.0 (p3.0) is set at "0×5", a 4-bit subconstant is set in p2.1 (p3.1), and a register number (m) is set in p2.2 (p3.2). Here, the operation is expressed by the mnemonic code "MOVU imm4,Rm".

When p2.0 (p3.0) is set at "0×7", a 4-bit subconstant is set in p2.1 (p3.1), and a register number (m) is set in p2.2 (p3.2). Here, the operation is expressed by the mnemonic code "ST Rm,(imm4)".

When p2.0 (p3.0) is set at "0×A", a 4-bit subconstant is set in p2.1 (p3.1), and a register number (m) is set in p2.2 (p3.2). Here, the operation is expressed by the mnemonic code "LD (imm4),Rm".

Among the above operations, the 12-bit subconstant shift and store operation (SFST12) and the 24-bit subconstant shift and store operation (SFST24) represent the subconstant shift and store operation, while the 4-bit subconstant use operations (shown in FIG. 4C) and the 8-bit subconstant use operation represent the stored constant use operation.

Internal Construction of VLIW Processor 22

Figure 3:
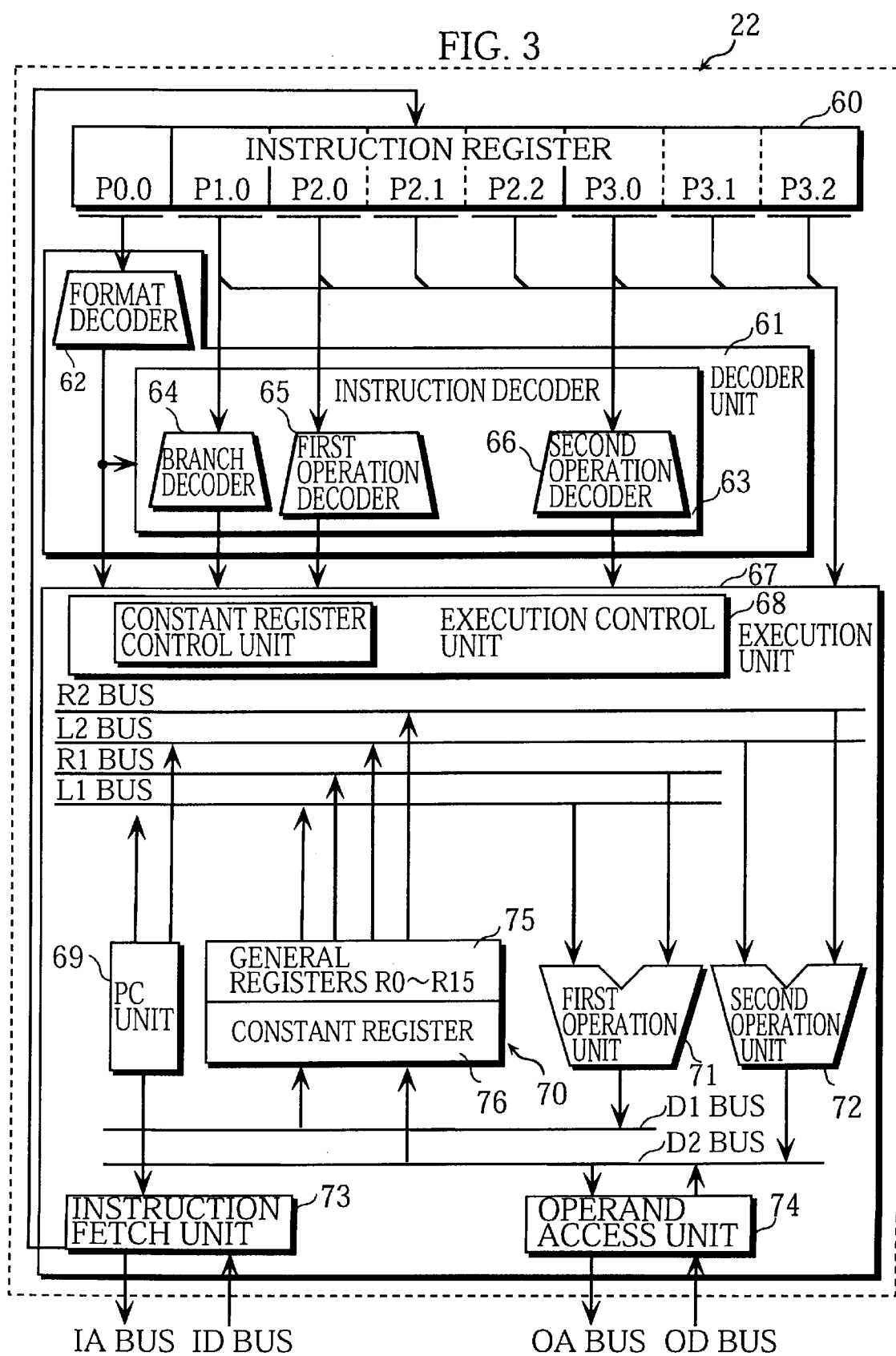
FIG. 3 shows the hardware construction of the VLIW processor 22 in the embodiment.

The following is an explanation of the internal construction of the VLIW processor 22 that can execute a maximum of three operations in parallel, with reference to FIG. 3. In the figure, the construction of the VLIW processor 22 can be roughly divided into an instruction register 60, a decoder unit 61, and an execution unit 67.

The instruction register 60 is a 32-bit register that stores one instruction that has been sent from an instruction fetch unit 73.

The decoder unit 61 decodes the instruction held in the instruction register 60 and outputs control signals to the execution unit 67 in accordance with the decoding result. This decoder unit 61 can itself be roughly divided into a format decoder 62 and an instruction decoder 63.

The instruction decoder 63 is composed of a branch decoder 64 that decodes an operation code held in the P1.0 field and controls a PC unit 69 accordingly, a first operation decoder 65 that decodes an operation code held in the P2.0 field and controls a first operation unit 71 accordingly, and a second operation decoder 66 that decodes an operation code held in the P3.0 field and controls a second operation unit 72 and an operand access unit 74 accordingly.

The format decoder 62 decodes a 4-bit format code held in the P0.0 field to identify the instruction format of the instruction held in the instruction register 60 as one of the plurality of instruction formats shown in FIG. 4A. In accordance with the decoding result, the format decoder 62 permits or prohibits decoding operations by the branch decoder 64, the first operation decoder 65, and the second operation decoder 66, and activates a constant register control unit of the execution unit 67.

The branch decoder 64, the first operation decoder 65, and the second operation decoder 66 fundamentally decode one operation in one cycle and send control signals to the execution unit 67.

The execution unit 67 operates according to the decoding result of the decoder unit 61 and is a circuit that is capable of executing a maximum of three operations in parallel. This execution unit 67 is composed of an execution control unit 68, the PC unit 69, a register set 70, the first operation unit 71, the second operation unit 72, the instruction fetch unit 73, and the operand access unit 74.

The execution control unit 68 is a control circuit for controlling the components included in the execution unit 67 according to the decoding result of the decoder unit 61. This execution control unit 68 includes the constant register control unit which performs control so that a constant held in the instruction register 60 is stored into the constant register 76 based on indications given by the format decoder 62.

The PC (Program Counter) unit 69 operates under the control of the branch decoder 64, and outputs an address in the memory 26 of the next instruction to be decoded and executed to the instruction fetch unit 73.

The instruction fetch unit 73 fetches an instruction block included in the monitor program 23 or the debug target program 24 from the memory 26 via a 32-bit IA (Instruction Address) bus and a 32-bit ID (Instruction Data) bus. The instruction fetch unit 73 stores the fetched instruction block into an internal instruction cache and supplies the instruction which corresponds to the address outputted by the PC unit 69 to the instruction register 60.

The register set 70 is composed of sixteen 32-bit general registers 75 and the 32-bit constant register 76. In accordance with the decoding results of the first operation decoder 65 and the second operation decoder 66, values which are stored in these registers 75 and 76 are transferred to the first operation unit 71 and the second operation unit 72. Here, operations are performed or alternatively the values are allowed to pass, before being sent to the register set 70 or the operand access unit 74. Values stored in the constant register 76 are used in the operations performed by the first operation unit 71 and the second operation unit 72, while the values are also transferred to the PC unit 69, where they are used to generate an effective address for a branch destination.

The first operation unit 71 internally includes an ALU (Arithmetic Logic Unit) for performing arithmetic logic operations on two 32-bit sets of data and a multiplier for performing multiplications on two 32-bit sets of data. This first operation unit 71 is capable of executing two types of operation (namely, arithmetic logic operation and inter-register transfer operation) under the control of the first operation decoder 65.

The second operation unit 72 internally includes an ALU for performing arithmetic logic operations on two 32-bit sets of data and a multiplier for performing multiplications on two 32-bit sets of data, in the same way as the first operation unit 71.

This second operation unit 72 is capable of executing two types of operation (namely, arithmetic logic operation and inter-register transfer operation) under the control of the second operation decoder 66.

The operand access unit 74 operates under the control of the second operation decoder 66 and is a circuit that transfers operands between the register set 70 and the inner-target work area 25 in the memory 26. The operand access unit 74 internally includes a buffer for storing operands and operand addresses. As a specific example, when the operation code "ld" is in the P3.1 field of the instruction register 60, one word of data that is located in the inner-target work area 25 is loaded via the operand access unit 74 into one of the registers in the register set 70. When the operation code "st" is present, meanwhile, the stored value of one of the registers in the register set 70 is stored into the inner-target work area 25.

Note that the ICE chip 32 which emulates the VLIW processor 22 and the host processor 14 which simulates the VLIW processor 22 by executing the simulator software 17 have different constructions from that shown in FIG. 3. However, these constructions do not entail any new disclosure and thus are not explained in this specification.

Operation of Debug Aid Device

The following is an explanation on how the debug aid device uses the simulator software 17, the ROM emulator 20, and the ICE board 30 to test the debug target program 24.

In accordance with the input made by the programmer via the keyboard 12, the debug aid device has one of the simulator software 17, the ROM emulator 20, and the ICE board 30 run the debug target program 24 at a start address specified by the programmer and stops the debug target program 24 at a stop address specified by the programmer. The debug aid device also has one of the simulator software 17, the ROM emulator 20, and the ICE board 30 read/write values from/into the memory when the debug target program 24 is in a stopped state.

In the above processing, the debug aid device has the display 11 display information on the debug target program 24 and storage values of the memory written as mnemonic codes along with information on source codes of the debug target program 24, in order to help the programmer understand the debug processing.

This debug aid device is realized by installing the debugger software in the host computer 10. Here, the debugger software is stored in a storage medium, such as the storage medium 40 shown in FIG. 2B, and distributed on the market as a package software.

In view of the above characteristic of the debug aid device, it is more appropriate to regard the debugger software stored in the storage medium, rather than the hardware resources (such as the processor and the memory) included in the host computer, as the function entity of the debug aid device. Similarly, since a software (such as the debugger software) which has been developed for complex processing is usually composed of a plurality of subroutines and work areas, each subroutine and work area included in the debugger software should be regarded as the components of the debug aid device. Hence the subroutines and work areas that compose the functions of the debug aid device and the program compiler device are regarded as the components of each device in the present embodiment.

Figure 5:
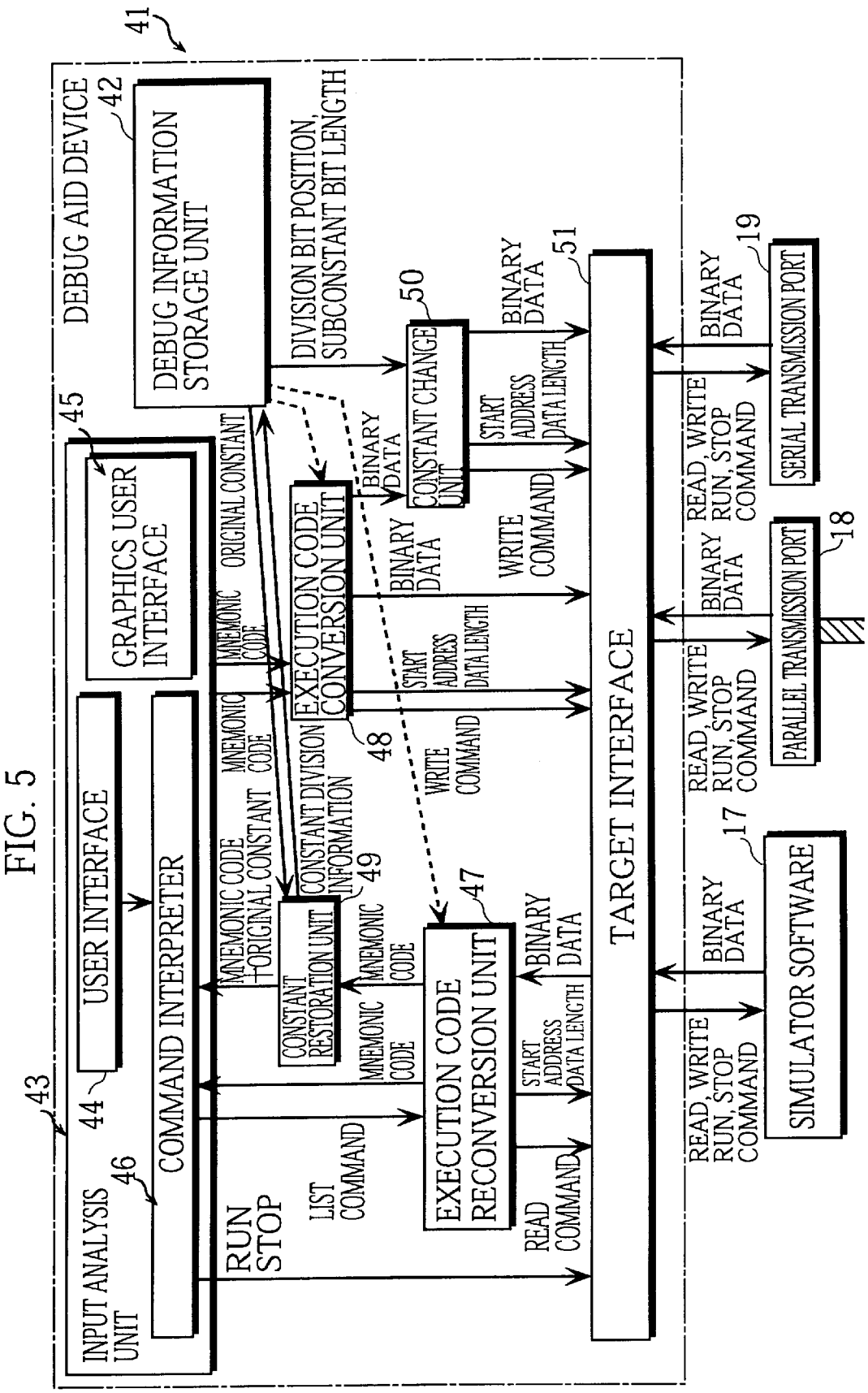
FIG. 5 is a function block diagram showing the internal construction of the debug aid device 41.

FIG. 5 shows the functional construction of the debug aid device 41 based on the above viewpoint. In the figure, the debug aid device 41 includes a debug information storage unit 42, a user interface 44, a graphics user interface 45, a command interpreter 46, an execution code reconversion unit 47, an execution code conversion unit 48, a constant restoration unit 49, a constant change unit 50, and a target interface 51. Here, the user interface 44, the graphics user interface 45, and the command interpreter 46 compose an input analysis unit 43.

The target interface 51 internally stores one of the simulator software 17, the ROM emulator 20, and the ICE board 30 for executing the debug target program 24 (in the present embodiment, one of the simulator software 17, the ROM emulator 20, and the ICE board 30 that executes the debug target program 24 is referred to as "work environment"). When the other components of the debug aid device 41 generate commands, such as a run command, a stop command, a read command, and a write command, the target interface 51 sends those commands to the work environment.

Figure 6:
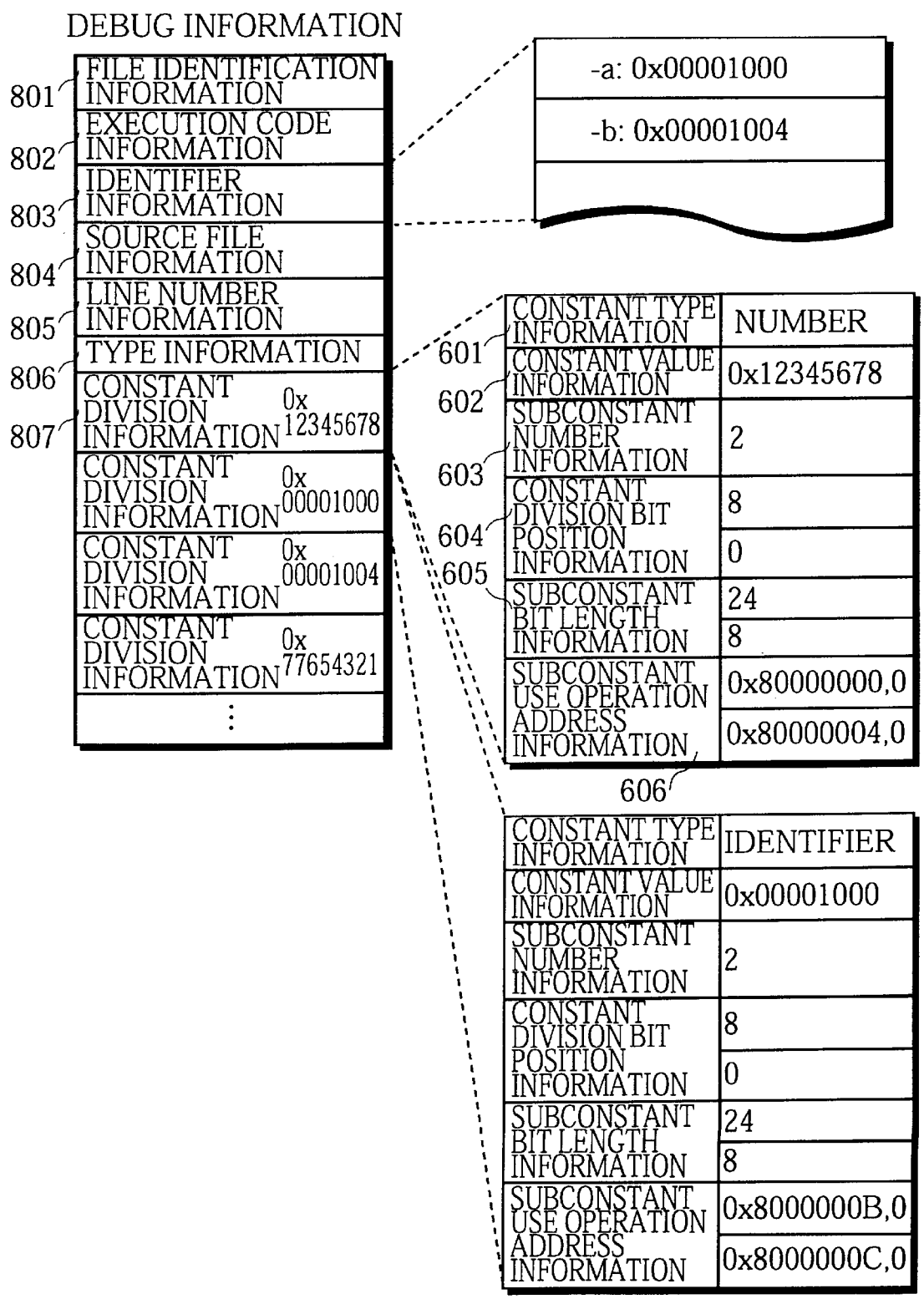

The debug information storage unit 42 stores debug information which is generated along with the debug target program 24. FIG. 6 shows an example logic format of the debug information.

In the figure, the debug information is made up of file identification information 801, execution code information 802, identifier information 803, source file information 804, line is number information 805, type information 806, and constant division information 807.

The file identification information 801 shows a processor type capable of executing the debug target program 24 and a of version of a program compiler software of a program compiler device that compiled the source program to the debug target program 24.

The execution code information 802 shows a correspondence table between mnemonic codes and execution codes.

The identifier information 803 shows a correspondence table between identifiers and their values. An example of the identifier information 803 is shown in the top right of the figure. In the example, identifier _a corresponds to a 32-bit value "0x00001000", while identifier _b corresponds to a 32-bit value "0x00001004".

The source file information 804 shows a name of the source program and its language, as well as addresses of execution codes generated by compiling the source program.

The line number information 805 shows a correspondence table between line numbers of statements written in the source program and addresses of execution codes generated by compiling the statements.

The type information 806 shows identifier types.

The constant division information 807 is used for identifying an original long-word constant written in the source program from subconstants which are used as operands in the subconstant shift and store operation and the stored constant use operation in the debug target program 24. Examples of the constant division information 807 are shown in the middle and bottom right of FIG. 6.

In each example, the constant division information is made up of constant type information 601 showing whether the long-word constant is expressed as a number or an identifier, constant value information 602 showing the constant value in hexadecimal notation, subconstant number information 603 showing the value k wherein the constant has been divided into k subconstants, constant division bit position information 604 showing all bit positions at which the constant has been divided, subconstant bit length information 605 showing a bit length of each subconstant, and subconstant use operation address information 606 showing an address of each operation that uses one of the subconstants.

Each operation address shown in the subconstant use operation address information 606 is expressed by a combination of an address of an instruction that includes the operation and a serial number for specifying the operation in the instruction when the instruction includes a plurality of operations.

The debug information in FIG. 6 includes four sets of constant division information respectively relating to constants "0×12345678", "0×00001000", "0×00001004", and "0×87654321". The examples of the constant division information 807 shown in the figure concern the constants "0×12345678" and "0×00001000".

In the constant division information 807 for the constant "0×12345678", the constant type information 601 shows that the constant is expressed as a number, the constant value information 602 shows that the constant value is "0×12345678", and the subconstant number information 603 shows that k is 2 when the constant has been divided into k subconstants. The constant division bit position information 604 shows that the constant has been divided at the 8th bit and the 0th bit from the lowest bit position, and the subconstant bit length information 605 shows that first and second subconstants obtained by dividing the constant have respectively 24 bits and 8 bits. The subconstant use operation address information 606 shows that the first subconstant is included in the 0th operation in instruction address 0×80000000 and the second subconstant is included in the 0th operation in instruction address 0×80000004.

In the constant division information 807 for the constant "0×00001000", the constant type information 601 shows that the constant is expressed as an identifier, the constant value information 602 shows that the constant value is "0×00001000", and the subconstant number information 603 shows that k is 2 when the constant has been divided into k subconstants. The constant division bit position information 604 shows that the constant has been divided at the 8th bit and the 0th bit from the lowest bit position, and the subconstant bit length information 605 shows that first and second subconstants obtained by dividing the constant have respectively 24 bits and 8 bits. The subconstant use operation address information 606 shows that the first subconstant is included in the 0th operation in instruction address 0×8000000B and the second subconstant is included in the 0th operation in instruction address 0×8000000C.

When the constant type information 601 shows "identifier", the identifier information 803 is referred to where each constant value is associated with an identifier written in the source program. According to the example identifier information 803 shown in FIG. 6 where the value "0×00001000" corresponds to identifier _a, the identifier for the constant "0×00001000" is specified as identifier _a. Thus, the constant division informaiton 807 is used to specify the original constant, and when the constant type information 601 shows that the original constant is expressed as an identifier in the source program, the identifier information 803 is used to specify the identifier.

In the debug information shown in FIG. 6, the file identification information 801 to the type information 806 are generated when generating the debug target program 24 and are not changed since then. On the other hand, the constant division information 807 generated along with the debug target program 24 may be renewed during the debugging by the debug aid device 41. Alternatively, the constant division information 807 may be generated during the debugging of the debug target program 24.

Which is to say, each time an execution code stored in the memory of the work environment is changed in the debug stage, the constant value information 602, the subconstant number information 603, the constant division bit position information 604, the subconstant bit length information 605, and the subconstant use operation address information 606 in the constant division information 807 are renewed in accordance with the changes. This renewal of the constant division information 807 is performed by the constant change unit 50. Also, when the debug information has not been generated along with the debug target program 24, the constant division information 807 is generated based on the execution code stored in the memory of the work environment in the debug stage. This generation of the constant division information 807 is performed by the constant restoration unit 49.

The user interface 44 has the display 11 display a debug command input request and receives the debug command inputted via the keyboard 12. The user interface 44 echos the inputted debug command back and then has the display 11 display an execution result of the debug command.

FIG. 7A shows a dialog display displayed on the display 11 when the user interface 44 performs the above processing.

The dialog display shown in the figure includes a command number column corresponding to an input debug command column, an absolute address column showing an address specified as the debug target, a machine language column showing binary data stored in the address, a first mnemonic code column showing a mnemonic code of a first operation obtained by reconverting the binary data, a symbol column showing a parallel execution symbol "∥" indicating that there are two operations, and a second mnemonic code column showing a mnemonic code of a second operation.

When the programmer inputs the debug command via the keyboard 12, the debug command is analyzed by the command interpreter 46 and executed by the work environment. The user interface 44 then has the display 11 display the execution result.

In FIG. 7A, "0012>" in the command number column shows a request to input the 12th debug command, "UX" in the input debug command column shows that a reconversion command has been inputted, and "0×80000000, 0×80000018" shows a start address and a stop address of the reconversion.

In the first and second mnemonic code columns, each mnemonic code in which a subconstant has been replaced with the original constant is color-coded in order to distinguish it from other mnemonic codes.

The user interface 44 also refers to the debug information stored in the debug information storage unit 42 and has the display 11 display information relating to the source program in greater detail. Here, the user interface 44 checks the debug target address against the source file information 804, specifies the source program that corresponds to the address, and has the display 11 display the name and the language type of the specified source program. The user interface 44 also reads statement line numbers corresponding to the debug target address from the line number information 805 and has the display 11 display the line numbers.

When the user interface 44 receives the debug command, the command interpreter 46 analyzes the debug command and controls the work environment according to the analysis result.

Here, when the debug command is a command to run/stop the debug target program 24, the command interpreter 46 controls the work environment to run/stop the debug target program 24.

When the debug command is a specified range reconversion command, the command interpreter 46 outputs a read command that specifies a start address and a data length to the work environment which accordingly reads execution codes stored in the specified range from the memory.

When the debug command is a change command with a write destination address specification and a new mnemonic code to be written is inputted via the keyboard 12, the command interpreter 46 has the execution-code conversion unit 48 convert the mnemonic code to an execution code and outputs a write command that specifies a start address and a data length to the work environment which accordingly writes the new execution code into the write destination address in the memory.

When the programmer inputs the reconversion command and the work environment outputs binary data read from the memory to the execution code reconversion unit 47, the execution code reconversion unit 47 judges whether the binary data is a program code or a data code. When the binary data is a program code, the execution code reconversion unit 47 reconverts the binary data to a mnemonic code according to the execution code information 802 in the debug information storage unit 42 and outputs the reconversion result to the command interpreter 46. When the binary data is a data code, the execution code reconversion unit 47 reconverts the binary data to an identifier according to the identifier information 803 and the type information 806 in the debug information storage unit 42 and outputs the reconversion result to the command interpreter 46.

FIGS. 7B–7E show the process of reconverting the binary data by the execution code reconversion unit 47. When the programmer inputs the reconversion command "UX" via the keyboard 12 as shown in FIG. 7A, binary data "08123456", "67280500", "08000010", "60700500" . . . "60740500" shown in FIG. 7B is read from the memory of the work environment. The execution code reconversion unit 47 then refers to the execution code information 802 to specify a mnemonic code corresponding to the highest 8 bits of each binary data set.

In FIG. 7C, the high-order 8 bits "08" of the binary data "08123456" correspond to an operation code "SFST24". Accordingly, the execution code reconversion unit 47 specifies the low-order 24 bits "123456" as a constant operand and generates an mnemonic code "SFST24 0x123456" as the reconversion result.

In FIG. 7D, "0x2" and "0x0" in the p2.0 and p2.2 fields in the binary data "67280500" correspond to an operation code "MOV~, R0". Accordingly, the execution code reconversion unit 47 specifies the low-order 12 bits "500" as an operation code "NOP" and generates a mnemonic code ".MOV 0x78,R0||NOP" as the reconversion result.

After reconverting the other binary data sets shown in FIG. 7B in the same way, mnemonic codes shown in FIG. 7E is obtained. Meanings of the mnemonic codes are shown below.

"SFST24 0x123456": Store a constant "0x123456" into the constant register 76.

"MOV 0x78,R0": Combine a constant "0x78" and the constant stored in the constant register 76 and assign the combination result to register R0.

"SFST24 0x000010": Store a constant "0x000010" into the constant register 76.

"ST R0,(0x00)": Store the value of register R0 into address 0x00001000 that is specified by the constant "0x000010" in the constant register 76 and a constant "0x00".

"SFST12 0x000": Store a constant "0x000" into the constant register 76.

"ADD R0,R0": Add the value of register R0 and the value of register R0 and store the addition result into register R0.

"SFST12 0x010": Store a constant "0x010" into the constant register 76.

"ADD 0x4,R0": Add a constant "0x4" to the value of register R0 and store the addition result into register R0.

"ST R0, (0x04)": Store the value of register R0 into address 0x00001004 that is specified by the value "000010" stored in the constant register 76 and a constant "0x00".

When binary data is reconverted to a mnemonic code by the execution code reconversion unit 47, the constant restoration unit 49 judges whether the mnemonic code includes a constant-related operation. Here, the constant-related operation means an operation that includes a constant operand as a result of reconverting the binary data according to the instruction formats shown in FIGS. 4A–4C. When the mnemonic code includes the constant-related operation, there is a possibility that the operand is a subconstant which has been generated by dividing a long-word constant written in the source program. In such a case, the constant restoration unit 49 detects constant division information relating to the subconstant in the debug information storage unit 42 in order to identify the original constant.

When the constant division information exists in the debug information storage unit 42, the constant restoration unit 49 specifies the constant-related operation as one of the subconstant shift and store operation and the stored constant use operation and replaces the subconstant included in the constant-related operation with the original constant shown in the constant division information. When, on the other hand, the constant division information does not exist in the debug information, the constant restoration unit 49 reads binary data adjacent to the constant-related operation from the memory, restores the original constant of the constant-related operation using subconstants obtained from the binary data, and replaces the subconstant in the constant-related operation with the restored original constant. The constant restoration unit 49 then creates constant division information which shows the original constant and the addresses of the constant-related operation and operations that include the obtained subconstants, and stores the constant division information into the debug information storage unit 42.

In FIG. 7E, since the mnemonic code "MOV 0x78,R0" is written immediately after the mnemonic code "SFST24

0x123456", "MOV 0x78,R0" is the stored constant use operation whose constant operand "0x78" is actually one of a plurality of subconstants to be stored into the constant register 76. Accordingly, the constant restoration unit 49 replaces the subconstant with the original constant and outputs the resulting mnemonic code to the command interpreter 46. Similarly, since the constant operand "0x123456" in the mnemonic code "SFST24 0x123456" is actually one of the plurality of subconstants to be stored into the constant register 76, the constant restoration unit 49 replaces the subconstant with the original constant and outputs the resulting mnemonic code to the command interpreter 46. This replacement processing will be explained in detail later.

When the user interface 44 receives the change command and the command interpreter 46 outputs a new mnemonic code to be written to the execution code conversion unit 48, the execution code conversion unit 48 outputs a write command specifying a start address and a data length to the target interface 51. The execution code conversion unit 48 also converts the new mnemonic code to binary data according to the execution code information 802 and outputs the binary data to the target interface 51.

When the mnemonic code is converted to the binary data in the execution code conversion unit 48, the constant change unit 50 judges whether the binary data includes a constant-related operation. If the constant-related operation is included, the constant change unit 50 judges that a long-word constant included in the old constant-related operation to be replaced has been divided into a plurality of subconstants in the memory. The constant change unit 50 accordingly searches the debug information storage unit 42 for constant division information relating to the old long-word constant in order to obtain the constant division bit position information 604 and the subconstant bit length information 605. If the constant division information exists in the debug information storage unit 42, the constant change unit 50 divides the long-word constant included in the new constant-related operation according to the constant division bit position information 604 and the subconstant bit length information 605.

The constant change unit 50 then outputs a write command specifying a start address and a data length to the target interface 51 so that each subconstant obtained by dividing the new long-word constant will be written into the work environment memory.

The graphics user interface 45 specifies, when the programmer operates a pointing device, such as a mouse 38 or cursor keys on the keyboard 12, on the display 11 that displays a plurality of mnemonic codes, one of the plurality of mnemonic codes and waits for the input of a new mnemonic code to be written. The inputted new mnemonic code is then converted to binary data by the execution code conversion unit 48. The execution code conversion unit 48 outputs a write command specifying a start address and a data length to the work environment which accordingly writes the binary data into the work environment memory.

The following is an explanation of the processing of the constant restoration unit 49 with reference to FIG. 9.

The constant restoration unit 49 sets variable i at 1 (Step S20) and waits until the execution code reconversion unit 47 reconverts execution code i read from the "i"th address in a memory range specified by the debug command. The constant restoration unit 49 then receives mnemonic code i (reconverted code i) from the execution code reconversion unit 47 (Step S21).

The constant restoration unit 49 judges whether the reconverted code i is a constant-related operation (Step S22).

When the reconverted code i is not the constant-related operation, the reconverted code i is directly displayed on the display 11, and the processing proceeds to Step S34. The constant restoration unit 49 judges whether variable i is variable n (Step S34). When variable i is equal to variable n, the constant restoration unit 49 completes the processing. Otherwise, the constant restoration unit 49 proceeds to Step S35 where variable i is incremented and then returns to Step S21.

When the reconverted code i is the constant-related operation i (Step S22), the constant restoration unit 49 detects constant division information j that corresponds to the constant-related operation i in the debug information storage unit 42 (Step S23), and judges whether the constant division information j exists (Step S24).

Here explains how to find the constant division information j that corresponds to the constant-related operation i.

The constant restoration unit 49 refers to the constant division bit position information 604 in constant division information and extracts subconstants from an original constant shown in the constant value information 602 according to the constant division bit position information 604. The constant restoration unit 49 then compares the subconstant of the constant-related operation i with each of the extracted subconstants.

The above extraction and comparison are performed for all sets of constant division information stored in the debug information storage unit 42. When a set of constant division information has the same subconstant as that of the constant-related operation i, the constant restoration unit 49 identifies the set of constant division information as the constant division information j.

When, on the other hand, a plurality of sets of constant division information have the same subconstant as that of the constant-related operation i, address i of the constant-related operation i is compared with each address written in the subconstant use operation address information 606 in each of the plurality of constant division information. As a result, if a set of constant division information whose subconstant use operation address information 606 shows address i of the constant-related operation i is detected, the set of constant division information is identified as the constant division information j.

The subconstant in the reconverted code i is replaced with the original constant value written in the constant division information j (Step S25). Next, a comma "," and a constant division bit position b shown in the constant division information j are added at the end of the reconverted code i (Step S26).

The constant restoration unit 49 retrieves a subconstant bit length, among subconstant bit lengths shown in the constant division information j, that matches a subconstant bit length k of the constant-related operation i (Step S27).

The constant restoration unit 49 judges whether the subconstant of the constant-related operation i is a subconstant starting from the highest bit position of the original constant (Step S28). Here, the subconstant bit length k is added to the constant division bit position b to judge whether the addition result matches the bit length of the original constant.

If they do not match, the value "b+k" is added after the constant division bit position b which has been added to the reconverted code i (Step S30).

As a result, the reconverted code i is displayed on the display 11 along with the original constant, the constant division bit position b, and the value "b+k". From the displayed information, the programmer can easily understand that the subconstant located in the "b"th to "b+k"th bit positions in the long-word constant written in the source program is used as a constant operand of the constant-related operation i.

If they match in Step S28, the symbol $ is added after the constant division bit position b (Step S29). As a result, the reconverted code i is displayed on the display 11 along with the original constant, the constant division bit position b, and the symbol $. From the displayed information, the programmer can easily understand that the subconstant located in the "b"th to highest bit positions in the long-word constant written in the source program is used as a constant operand of the constant-related operation i.

The constant restoration unit 49 refers to the constant type information 601 in the constant division information j (Step S31). If the constant type information 601 shows "identifier", the constant restoration unit 49 retrieves an identifier corresponding to the original constant of the constant-related operation i from the identifier information 803 in the debug information (Step S32). The constant restoration unit 49 then replaces the original constant written in the constant-related operation i with the retrieved identifier (Step S33) and proceeds to Step S34.

The above explanation is based on a case when the constant division information j exists in the debug information storage log unit 42. Next, the processing when the constant division information j does not exist is explained.

Note that since the scheduling has been performed on the debug target program 24 at the time of the compilation, the execution order of the operations differs from the execution order written in the source program. However, in the scheduling, subconstant shift and store operations and a stored constant use operation relating to one long-word constant are never separated with each other by an operation relating to another long-word constant. Also, the order in which the subconstant shift and store operations for defining operands are followed by the stored constant use operation for using the operands is never changed.

Since the execution order of the operations has been modified without breaking the order mentioned above, it is possible to obtain the original constant even when the constant division information has not been generated during the compilation. This can be done by successively reading the subconstant shift and store operations and/or the stored constant use operation from the work environment memory and arranging subconstant operands included in the read operations.

When the constant-related operation i is a stored constant use operation, each subconstant shift and store operation located in a rearward position of the stored constant use operation is read and a subconstant included in each read operation is sequentially written into the memory 15 in the host computer 10. The original constant is obtained by combining the subconstants written in the memory 15 with a subconstant of the stored constant use operation.

When the constant-related operation i is a subconstant shift and store operation, a stored constant use operation is detected from operations located in a forward direction of the subconstant shift and store operation. Since the detected stored constant use operation uses the original constant of a subconstant included in the subconstant shift and store operation as one of the operands, the original constant is obtained in the same processing as above.

The subconstant bit length k of the constant-related operation i is subtracted from the standard bit length L of the original constant to generate the difference bit length m (Step S36). Next, the constant restoration unit 49 judges whether execution history information is stored in the work environment memory (Step S37).

Here, the execution history information is made up of addresses of operations in the debug target program 24 which have been executed. When the simulator software 17 is the work environment, the execution history information is stored in the memory 15. When the ROM emulator 20 is the work environment, on the other hand, the execution history information cannot be stored in the memory 26 due to its limited memory size. When the ICE board 30 is the work environment, only the restricted amount of the execution history information can be stored in the memory 33 due to its limited memory size (some ICE boards do not have a capacity for storing the execution history information).

The reason why the constant restoration unit 49 judges whether the execution history information exists in Step S37 is that the original constant can be restored more accurately by referring to the execution history information.

For instance, when a conditional branch instruction which leads to either of two routes that each includes a subconstant shift and store operation is included in the debug target program 24, it is necessary to specify which subconstant shift and store operation has been executed in order to identify a subconstant stored in the constant register 76. In such a case, the correct original constant may not be restored just by reading operations in the forward/rearward directions of the constant-related operation i.

However, by using the execution history information, the original constant can be correctly restored, since an address of the subconstant shift and store operation which has been executed is stored in the execution history information. Thus, the original constant can be identified more accurately by using the execution history information.

When the execution history information exists in the work environment memory, the constant restoration unit 49 sets operation addresses specified by the execution history information as a search area (Step S38). When, on the other hand, the execution history information does not exist in the memory, the constant restoration unit 49 sets operation addresses adjacent to the constant-related operation i as a search area (Step S39).

The constant restoration unit 49 detects operations p whose subconstant operand is not more than the difference bit length m from the search area (Step S40).

When an operation whose subconstant has the same length as the difference bit length m is detected, the subconstant of the constant-related operation i is combined with the subconstant of the detected operation.

When a plurality of operations that each have a subconstant shorter than the difference bit length m are detected, the subconstant of the constant-related operation i is combined with the subconstants of the detected operations until the total bit length reaches the standard long-word constant length (32 bits in the present example).

The constant restoration unit 49 generates a template of the constant division information j for the constant-related operation i (Step S41) and calculates the original constant from the subconstant of the constant-related operation i and the subconstants of the operations p, the original constant then being written into the constant division information j as the constant value information 602 (Step S42). The constant restoration unit 49 also writes the subconstant number information 603, the constant division bit position information 604, and the subconstant bit length information 605, which are obtained from the bit lengths of the subconstants of the constant-related operation i and the operations p, into the constant division information j (Step S43). The constant restoration unit 49 then writes the address of the constant-related operation i and the addresses of the operations p into the constant division information j as the subconstant use operation address information 606 (Step S44).

To restore the original constant as above, it is necessary to frequently read execution codes from the memory. When the work environment is the ICE board 30, data can be transmitted at high speed between the host computer 10 and the ICE board 30 as they are connected by the parallel line 31. Also, when the work environment is the simulator software 17, the work environment can read execution codes easily from the memory 15 in the host computer 10.

When the work environment is the ROM emulator 20, however, data cannot be transmitted at high speed between the host computer 10 and the ROM emulator 20 as they are connected by the serial line 21. In such a case, it takes a considerable time to repeatedly read the execution codes and restore the original constant. Thus, it is preferable to generate constant division information during the generation of the debug target program and store the constant division information in the debug information storage unit 42 so that the debugging can be performed easily.

The following is a specific explanation of the processing of the constant restoration unit 49 with reference to FIGS. 7B–7F.

After the work environment reads the execution code "08123456" from address 0x80000000, the execution code reconversion unit 47 reconverts the execution code to the mnemonic code "SFST24 0x123456". The constant restoration unit 49 judges that the mnemonic code "SFST24 0x123456" is a constant-related operation (Step S22). The constant restoration unit 49 detects constant division information whose subconstant use operation address information 606 shows address 0x80000000 in the debug information shown in FIG. 6 (Step S23). When the constant division information is detected, the constant restoration unit 49 obtains the original constant "0x12345678" from the constant value information 602 and changes the mnemonic code "SFST24 0x123456" displayed on the display 11 to the mnemonic code "SFST24 0x12345678". The constant restoration unit 49 then obtains the division bit position "8" and the subconstant bit lengths "24" and "8" respectively from the constant division bit position information 604 and the subconstant bit length information 605 and changes the displayed mnemonic code "SFST24 0x12345678" to "SFST24 0x12345678,8" (Step S26). Also, since 24 (subconstant bit length)+8 (constant division bit position)= 32 (long-word constant bit length), the constant restoration unit 49 judges that the subconstant of the constant-related operation "SFST 0x12345678,8" is a subconstant starting from the highest bit position of the original constant (Step S28). Accordingly, the constant restoration unit 49 adds the symbol $ to the displayed mnemonic code and as a result "SFST24 0x12345678,8,$" is displayed on the display 11 (Step S29). Since the constant type information 601 shows "number" (Step S31), the constant restoration unit 49 completes the processing.

When, on the other hand, the constant division information is not detected in Step S24, the constant restoration unit 49 subtracts the subconstant bit length (24) of the constant-related operation "SFST24 0x123456" from the standard constant bit length (32) and obtains the difference bit length (8). The constant restoration unit 49 then detects constant-related operations from addresses adjacent to address 0x80000000. Here, the constant restoration unit 49 first judges whether the execution history information is stored in the memory (Step S37). If so, the constant restoration unit 49 detects the constant-related operations from addresses specified by the execution history information (Step S38). Otherwise, the constant restoration unit 49 detects the constant-related operations from the addresses adjacent to address 0x80000000 (Step S39).

As a result, the constant-related operations "SFST12 0x000", "MOV 0x78,R0", and "SFST24 0x000010" are detected from the mnemonic code shown in FIG. 7E. Among these, the constant-related operation "SFST12 0x000" is excluded since it has the 12-bit subconstant that is longer than the difference bit length (8 bits). Consequently, the constant-related operation "NOV 0x78,R0" is selected that has the subconstant "0x78" shorter than the different bit length (8 bits) and that is closer to the constant-related operation "SFST 0x123456". The constant restoration unit 49 specifies the constant-related operation "MOV 0x78,R0" as the stored constant use operation which uses the subconstant of the subconstant shift and store operation "SFST24 0x123456".

In Steps S40–S44, the constant restoration unit 49 specifies the constant value information 602, the subconstant number information 603, the constant division bit position information 604, the subconstant bit length information 605, and the subconstant use operation address information 606 and writes them into the constant division information, as well as writing "number" in the constant value information 601. As a result, the constant division information is generated and stored into the debug information storage unit 42. The processing them proceeds to Steps S25–S33 and as a result the mnemonic code "SFST24 0x12345678,8,$" is generated.

Next, the work environment reads the execution code "08000010" from address 0x80000008, the execution code reconversion unit 47 reconverts the execution code to the mnemonic code "SFST24 0x000010". The constant restoration unit 49 judges that the mnemonic code "SFST24 0x000010" is a constant-related operation (Step S22). The constant restoration unit 49 detects constant division information that corresponds to the constant-related operation "SFST24 000010" in the debug information shown in FIG. 6 (Step S23). When the constant division information is detected, the constant restoration unit 49 obtains the original constant "0x00001000" from the constant value information 602 and changes the mnemonic code "SFST24 0x000010" displayed on the display 11 to the mnemonic code "SFST24 0x00001000". The constant restoration unit 49 then obtains the division bit position "8" and the subconstant bit lengths "24" and "8" respectively from the constant division bit position information 604 and the subconstant bit length information 605 and changes the displayed mnemonic code "SFST24 0x00001000" to "SFST24 0x00001000,8" (Step S26). Also, since 24 (subconstant bit length)+8 (constant division bit position)=32 (long-word constant bit length), the constant restoration unit 49 judges that the subconstant of the constant-related operation "SFST 0x00001000,8" is a subconstant starting from the highest bit position of the original constant (Step S28). Accordingly, the constant restoration unit 49 adds the symbol $ to the displayed mnemonic code and as a result "SFST24 0x00001000,8,$" is displayed on the display 11 (Step S29). The constant restoration unit 49 then judges whether the constant type information 601 shows "identifier" (Step S31).

Since the constant type information 601 for the constant "0x00001000" shows "identifier" in FIG. 6, identifier __a corresponding to the constant "0x00001000" is retrieved from the identifier information 803, and the displayed mnemonic code "SFST24 0x00001000,8,$" is changed to "SFST24 __a,8,$". The mnemonic code displayed as a result of the above processing is shown in FIG. 7F.

Here, the user interface 44 color-codes each group of constant-related operations that relate to one long-word constant, while displaying other outputs in a different color. In FIG. 7F, for example, "SFST24 0x12345678,8,$" and "MOV 0x12345678,R0" which relate to the constant "0x12345678" are displayed in a color 1, while "SFST24 __a,8,$" and "ST R0,(__a)" which relate to identifier __a are displayed in a color 2.

The same processing is repeated for addresses 0x80000010 to 0x80000018, and as a result mnemonic codes "SFST24 0x12345678,8,$" to "ST R0,(__b)" are displayed on the display 11.

The following is an explanation of the processing of the constant change unit 50 when the programmer inputs an execution code change command via the keyboard 12, with reference to FIGS. 10A and 10B.

In FIG. 10A, when the change command is inputted, the constant change unit 50 waits for the input of change target address d (Step S70). The work environment reads an execution code from change target address d (Step S71), and the execution code reconversion unit 47 reconverts the read execution code in order to obtain an old mnemonic code x. The old mnemonic code x is displayed on the display 11 along with the symbol "?" for requesting to input a new mnemonic code y (Step S72). The constant change unit 50 waits for the key input.

On receiving the key input, it is judged whether the inputted key code is a space (Step S75). If so, the processing proceeds to Step S74 and address d is renewed. Otherwise, the processing proceeds to Step S76.

It is judged whether the inputted key code is a period "." (Step S76). If so, the processing ends. Otherwise, the processing proceeds to Step S51 where the constant change unit 50 judges whether the new mnemonic code y is a constant-related operation. If it is the constant-related operation, the constant change unit judges whether a constant of the new mnemonic code y is an identifier (Step S52). If so, a number corresponding to the identifier is retrieved from the debug information and the identifier is replaced with the number (Step S53).

Next, it is judged whether the old mnemonic code x is a constant-related operation (Step S54). If not, a warning is displayed (Step S55) and the old mnemonic code x is replaced with the new mnemonic code y (Step S56), before proceeding to Step S74.

If the old mnemonic code x is the constant-related operation in Step S54, the constant change unit 50 detects constant division information z whose subconstant use operation address information 606 shows address d of the old mnemonic code x from the debug information (Step S57). The constant change unit 50 judges whether the constant division information z exists (Step S58).

If the constant division information z exists, the constant of the new mnemonic code y is written into the constant division information z as new constant value information 602 (Step S60). The constant change unit 50 then refers to the subconstant use operation address information 606 to find addresses of constant-related operations which relate to the same long-word constant as the old mnemonic code x. The constant change unit 50 also divides the constant of the new mnemonic code y at the bit position shown in the constant division bit position information 604 (Step S61). The generated subconstants are then respectively written into the addresses shown by the subconstant use operation address information 606 as the new constant operands.

When, on the other hand, the constant division information z does not exist in Step S58, the processing proceeds to Steps S36–S44 shown in FIG. 10B. Steps S36–S44 in FIG. 10B are the same as Steps S36–S44 shown in FIG. 9 where the constant division information z is generated by detecting constant-related operations. The generated constant division information z is then used in Steps S60 and S61, before completing the processing.

FIGS. 8A–8E show a specific example of the process of rewriting execution codes by the constant change unit 50 according to a debug command inputted by the programmer. The code "0014>" in FIG. 8A shows a request for inputting the 14th debug command. Here, the programmer inputs an execution code change command "AA" as the debug command and change target address 0x80000000.

The work environment reads the execution code "08123456" stored in address 0x80000000 from the memory (Step S71). After reconversion, the mnemonic code "SFST24 0x12345678,8,$" is displayed on the display 11 along with the symbol "?" for requesting to input a new mnemonic code, as shown in FIG. 8B (Step S72). When the programmer inputs a mnemonic code "SFST24 0x87654321,8,$" as shown in FIG. 8C, the constant change unit 50 detects constant division information corresponding to the old mnemonic code "SFST24 0x12345678,8,$" in the debug information storage unit 42 (Step S57). The constant change unit 50 then writes the constant "0x87654321" of the new mnemonic code "SFST24 0x87654321,8,$" into the detected constant division information as the new constant value information 602 (Step S60).

The constant change unit 50 refers to the subconstant use operation address information 606 to find addresses of constant-related operations which relate to the long-word constant "0x12345678" as does the old mnemonic code "SFST24 0x12345678,8,$". In FIG. 6, the subconstant use operation address information 606 shows addresses 0x80000000 and 0x80000004.

The constant change unit 50 then divides the new longword constant "0x87654321" at the 8th bit position according to the constant division bit position information 604. The generated subconstants "0x876543" and "0x21" are respectively written into addresses 0x80000000 and 0x80000004 as the new constant operands (Step S61).

Here, the execution codes "08123456" and "67280500" written in addresses 0x80000000 and 0x80000004 are respectively replaced with execution codes "08876543" and "62210500", as shown in FIG. 8D.

On completing the execution code change in address 0x80000000, change target address d is incremented (Step S74). The work environment reads the execution code "62210500" from address 0x80000004 (Step S71), and the execution code reconversion unit 47 reconverts the execution code to a mnemonic code "MOV 0x21,R0". The constant restoration unit 49 detects the constant division information 807 for the mnemonic code "MOV 0x21,R0" in the debug information storage unit 42 and replaces the subconstant "0x21" with the new long-word constant "0x87654321" shown in the constant value information 602. As a result, a mnemonic code "MOV 0x87654321,R0" shown in FIG. 8E is displayed for the execution code stored in address 0x80000004.

The case when the programmer specifies the change target not by the key input but by using the cursor keys or the mouse 38 is explained below.

For example, on the display 11 that displays the reconversion results "SFST24 0x12345678,8,$" to "ST R0,(__b)" shown in FIG. 7F, the programmer specifies a constant-related operation that includes the constant "0x12345678" as the change target using the cursor keys or the mouse 38.

The graphics user interface 45 has the constant change unit 50 read the constant division information 807 for the constant "0×12345678" from the debug information storage unit 42 and refers to the constant division bit position information 604, the subconstant bit length information 605, and the subconstant use operation address information 606 in order to specify the other constant-related operations which relate to the constant "0×12345678". When the programmer specifies the constant-related operation "SFST24 0×12345678,8,$" on the display 11, for instance, the constant change unit 50 specifies the constant-related operation "MOV 0×12345678,R0" as relating to the same constant "0×12345678". The constant change unit 50 then rewrites the two constant-related operations in the same way as above.

Internal Construction of Program Compiler Device

The following is an explanation of the program compiler device with reference to FIGS. 11–17.

FIG. 11 shows the functional construction of the program compiler device 81.

A program work area 82 is made up of directories written in the hard disc drive 13 and stores the source program inputted using text editors in the host computer 10. The program work area 82 is also used for generating the debug target program and the debug information.

FIG. 12A shows an example of the source program stored in the program work area 82.

The example program in FIG. 12A is composed of a statement of assigning a hexadecimal number "0×12345678" to global variable a and a statement of multiplying global variable a by 2, adding the value "4" to the multiplication result, and assigning the addition result to global variable b. Global variables a and b are expressed as identifiers _a and _b. Note that the grammar check has already been performed on the source program.

A program conversion unit 83 converts the source program stored in the program work area 82 to an intermediate description program. For instance, when variables a and b written in the source program in FIG. 12A are specified as registers R0 and R1, the program conversion unit 83 converts the source program to an intermediate description program shown in FIG. 12B. Each statement in the figure has the following meaning.

"_DATA SECTION DATA" : Pseudo-instruction showing a start of data.

"GLOBAL _a": Pseudo-instruction showing that variable a is a global variable.

"DS 4": Pseudo-instruction for securing an area for variable a.

"GLOBAL _b": Pseudo-instruction showing that variable b is a global variable.

"DS 4": Pseudo-instruction for securing an area for variable b.

"_TEXT SECTION TEXT": Pseudo-instruction showing a start of execution codes. "MOV 0×12345678,R0": Instruction for assigning a constant "0×12345678" to register R0.

"ST R0,(_a)": Instruction for storing the value of register R0 into an address specified by variable a.

"ADD R0,R0": Instruction for adding the value of register R0 and the value of register R0 and assigning the addition result to register R0.

"ADD 4,R0": Instruction for adding a constant "4" to the value of register R0 and assigning the addition result to register R0.

"ST R0,(_b)": Instruction for storing the value of register R0 into an address specified by variable b.

In this stage, the constants included in the instructions "MOV 0×12345678,R0", "ST R0,(_a)", and "ST R0,(_b)" have not been divided yet. The constant operand "4" in the instruction "ADD 4,R0" is not divided because of the short length.

A constant division unit 84 detects each instruction that includes a long-word constant in the intermediate description program and changes the instruction to an operation sequence that is composed of (k-1) subconstant shift and store operations and a stored constant use operation, wherein each operation includes one of k subconstants obtained by dividing the long-word constant. In the stored constant use operation, the operation code is the same as the operation code in the instruction, while the long-word constant in the instruction has been replaced with the subconstant operand other than the (k-1) subconstants in the subconstant shift and store operations.

Note that the constant division bit position and the subconstant number vary when dividing a long-word constant.

FIG. 12C shows a result of dividing each 32-bit constant in the intermediate description program shown in FIG. 12B into a 24-bit subconstant and an 8-bit subconstant. As shown in the figures, the instruction "MOV 0×12345678,R0" is replaced with operations "SFST24 0×123456,8,$" and "MOV 0×78,R0". The instruction "ST R0, (_a)" is replaced with operations "SFST24 _a,8,$" and "ST R0,(_a)". The instruction "ST R0, (_b)" is replaced with operations "SFST24 _b,8,$" and "ST R0,(_b)".

It should be noted that the constant division bit position and the subconstant number used here are not fixed and thus they might be changed by the time execution codes are generated. The meaning of each operation after the constant division is explained below.

"SFST24 0×123456,8,$": Store the high-order 24 bits of the constant "0×12345678" into the constant register 76.

"MOV 0×78,R0": Combine the low-order 8 bits of the constant "0×12345678" with the subconstant stored in the constant register 76 and assign the combination to register R0.

"SFST24 _a,8,$": Store the high-order 24 bits of variable a into the constant register 76.

"ST R0,(_a)": Store the value of register R0 into an address specified by variable a.

"SFST24 _b,8,$": Store the high-order 24 bits of variable b into the constant register 76.

"ST R0,(_b)": Store the value of register R0 into an address specified by variable b.

In FIG. 12C, the operations "MOV 0×78,R0", "ST R0, (_a)", "ADD R0,R0", "ADD 4,R0", and "ST R0, (_b)" have 12 bits or less. However, neither of them can be executed in parallel, either because an adjacent operation is longer than 12 bits, or because the adjacent operation requires the access to the same resource.

A debug information output unit 85 judges whether the programmer has specified a debug information generation option at the start of the program compiler device 81. If the programmer has specified the debug information generation option, the debug information output unit 85 monitors the program compilation processing of the program conversion unit 83, the constant division unit 84, a program optimization unit 87, and an execution code output unit 88 and generates debug information in the program work area 82 by writing parameters, among all parameters generated in the compilation processing, that relate to the debug processing into a predetermined format. The generation of the debug information that does not include constant division information can be performed by conventional program compiler devices, and the present invention does not entail any new disclosure concerning the matter. Accordingly, the processing of generating the debug information that does not include the constant division information by the debug information output unit 85 is not explained here in detail.

However, since the generation of the constant division information constitutes the main features of the present invention, the components relating to such generation (constant division information generation unit 86 and constant division information modification unit 89) are explained in detail below.

The constant division information generation unit 86 generates constant division information for each long-word constant that is divided by the constant division unit 84.

FIG. 13 is a flowchart showing the generation of the constant division information. In the figure, variable k specifies the "k"th constant (hereinafter, constant k) of L bits in the source program. Variable q specifies a bit position in constant k, while variable j specifies one of operations included in an instruction sequence. When operation j includes a constant operand, variable r specifies a bit length of the constant operand. FIGS. 14A and 14B show examples of operations and a long-word constant written using the above variables.

In the examples, "imm1, imm2, . . . , immx" shows that a long-word constant is divided into a given number of subconstants at given bit positions. The given number of subconstants are each used in one of the operations 1–10 (j=1 to j=10) as an operand. Variable q shows a bit position at which each subconstant starts, while variable r shows a bit length of each subconstant.

In FIG. 13, the constant division information generation unit 86 sets both variable k and variable j at 1 (Step S1) and retrieves constant k of the bit length L from the source program (Step S2). The constant division information generation unit 86 generates a template of constant division information k for constant k (Step S3) and then proceeds to Step S4 where variable q is set at 1.

The constant division information generation unit 86 retrieves operation j from the instruction sequence (Step S5) and judges whether operation j is an operation "SFST(r) imm,q,q+r" (Step S6). Here, the operation "SFST(r) imm, q,q+r" is a subconstant shift and store operation that uses an r-bit subconstant (1≦r≦L) starting from the "q"th bit of constant k. If operation j is the subconstant shift and store operation, the lot constant division information generation unit 86 writes constant k into the constant value information 602 in constant division information k (Step S7) and writes an address of operation j into the subconstant use operation address information 606 in constant division information k (Step S8). The constant division information generation unit 86 judges whether q (bit position)+r (bit length)=L (bit length of constant k) (Step S9). If q+r L, variable q is set at "q+r" and variable j is incremented (Step S10), before returning to Step S5.

The constant division information generation unit 86 retrieves operation j from the instruction sequence (Step S5) and judges whether operation j is an operation "SFST(r) imm,q,q+r" (Step S6). When two consecutive subconstant shift and store operations exist in the instruction sequence, the processing proceeds to Steps S7–S8.

When, on the other hand, operation j is not a subconstant shift and store operation, the constant division information generation unit 86 judges whether operation j is a stored constant use operation that includes an r-bit subconstant as an operand (Step S17). If so, an address of operation j is written into the subconstant use operation address information 606 in constant division information k (Step S18). The constant division information generation unit 86 also fills in the constant division bit position information 604 and the subconstant bit length information 605 based on bit position q and bit length r (Step S19) and proceeds to Step S9.

If, in Step S17, operation j is not the stored constant use operation, variable j is incremented (Step S20), before returning to Step S5.

When q+r=L in Step S9, the constant division information generation unit 86 judges whether variable k matches the total number n of long-word constants written in the source program (Step S15). When they do not match, variable k is incremented (Step S16), and the processing returns to Step S2.

As a result of the above processing, constant division information for each long-word constant is generated in the program work area 82.

FIGS. 15A–15C show constant division information generated for the long-word constants included in the intermediate description program shown in FIG. 12C.

FIG. 15A shows constant division information for the constant "0×12345678". In the figure, the constant type information 601 shows that the constant is expressed as a number, the constant value information 602 shows the original constant value "0×12345678", and the subconstant number information 603 shows that the constant has been divided into two constants. The constant division bit position information 604 shows that the constant has been divided at the eighth bit, and the subconstant bit length information 605 shows that the two subconstants are 24 bits and 8 bits. The subconstant use operation address information 606 shows relative addresses 0×0000.0 and 0×0004.0 of the operations "SFST24 0×123456,8,$" and "MOV 0×78,R0" shown in FIG. 12C.

FIG. 15B shows constant division information for identifier __a. In the figure, the constant type information 601 shows that the constant is expressed as an identifier, the constant value information 602 shows identifier __a as the original constant value, and the subconstant number information 603 shows that the constant has been divided into two constants. The constant division bit position information 604 shows that the constant has been divided at the eighth bit, and the subconstant bit length information 605 shows that the two subconstants are 24 bits and 8 bits. The subconstant use operation address information 606 shows relative addresses 0×0008.0 and 0×000C.0 of the operations "SFST24 __a,8,$" and "ST R0,(__a)" shown in FIG. 12C.

FIG. 15C shows constant division information for identifier __b. In the figure, the constant type information 601 shows that the constant is expressed as an identifier, the constant value information 602 shows identifier __b as the original constant value, and the subconstant number information 603 shows that the constant has been divided into two constants. The constant division bit position information 604 shows that the constant has been divided at the eighth bit, and the subconstant bit length information 605 shows that the two subconstants are 24 bits and 8 bits. The subconstant use operation address information 606 shows relative addresses 0×0018.0 and 0×001C.0 of the operations "SFST24 __b,8,$" and "ST R0,(__b)" shown in FIG. 12C.

The program optimization unit 87 optimizes the intermediate description program by changing the execution order of operations and deleting unnecessary operations. By doing so, the program optimization unit 87 generates parallel assembler codes in which optimized assembler instructions are packed. Here, the parallel assembler code is an assembler code to be processed by a VLIW processor and includes serial- and parallel-arranged assembler instructions that each specify a plurality of parallel-executable operations.

The above processing by the program optimization unit 87 is especially effective when dividing long-word constants. The loci optimization relating to the constant division can be classified into the following types.

The first type is to change the constant division pattern, such as by dividing a constant that has been divided into 24 bits and 8 bits into 12 bits, 12 bits, and 8 bits, or by dividing a constant that has been divided into 12 bits, 12 bits, and 8 bits into 24 bits and 8 bits.

The second type is to change the constant division bit position, such as by dividing a subconstant that has been divided into 24 bits and 8 bits into 8 bits and 24 bits. The third type is to switch the execution order between constant-related operations and other operations so as to avoid conflicts on the buses. These various types are employed separately or together for optimizing the intermediate description program.

In addition, when a bit length of an address is changed as a result of absolute address assignment, the program optimization unit 87 optimizes the program according to the change.

Specific examples of the optimization are explained below.

FIG. 12D shows a result of optimizing the intermediate description program shown in FIG. 12C. In the figure, the operation "SFST24 _b,8,$" in FIG. 12C is divided into operations "SFST12 _b,20,$" and "SFST12 _b,8,20", showing that the program optimization unit 87 has changed the constant division pattern from "24+8" to "12+12+8". As a result, the operations "SFST12 _b,20,$" and "ADD R0,R0" are packed in one instruction, while the operations "SFST12 _b,8,20" and "ADD 4,R0" are packed in the other instruction.

Thus, the above two sets of operations can each be executed in parallel as a result of dividing the long-word constants into smaller constants and rearranging the operations.

The execution code output unit 88 converts the parallel assembler codes outputted from the program optimization unit 87 into relocatable object codes that can be executed by the VLIW processor and relocation information for showing labels used for the object codes, operation addresses corresponding to the labels, and each label size.

The execution code output unit 88 then concatenates the relocatable object codes into one sequence, as well as calculating a final address for each label and determining each label size. For instance, when absolute address 0×80000000 is assigned to the execution codes shown in FIG. 12D, the execution code output unit 88 adds the absolute address to each offset address.

Suppose addresses 0×80000000 and 0×00001000 are respectively assigned to the code area and the data area, while addresses 0×0000 and 0×0004 are assigned to variables a and b in the data area. The address assignment result is shown in FIG. 12E.

The execution code sequence that has been assigned absolute addresses as above is stored into each memory of the simulator software 17, the ROM emulator 20, and the ICE board 30 as the executable debug target program 24. The debug information including the constant division information is stored into the debug information storage unit 42. Following the above compilation processing, the debug aid device performs debugging on the debug target program 24.

The constant division information modification unit 89 renews a relative address of each operation in the intermediate description program corresponding to the changes of the relative address after the optimization by the program optimization unit 87, and calculates each load address from the renewed relative address and the program address assigned by the execution code output unit 88, the load address then being written into the subconstant use operation address information 606 in the constant division information 807.

Thus, the constant division information 807 is modified to conform to the contents of the debug target program 24 in response to the optimization of the program by the program optimization unit 87, such as by rearranging/deleting the operations.

FIGS. 16A–16C show examples of constant division information that has been modified in response to the optimization. FIGS. 16A and 16B show the constant division information for the constants "0×12345678" and "_a" that are not modified.

FIG. 16C shows the modified constant division information for the constant "_b". In the figure, the subconstant number information 603 is changed from "2" to "3", while the constant division bit position information 604 is changed from "8" to "8, 20". The subconstant bit length information 605 is changed from "24, 8" to "12, 12, 8" showing the new constant division pattern "12+12+8". The subconstant use operation address information 606 shows relative addresses 0×0010.0, 0×0014.1, and 0×0018.1 respectively for the operations "SFST12 _b,20,$", "SFST12 _b,8,20", and "ST R0, (_b)" shown in FIG. 12D, instead of previous addresses 0×0008.0 and 0×000C.0.

FIGS. 17A–17C show examples of constant division information that has been modified corresponding to the absolute address assignment by the execution code output unit 88.

FIG. 17A shows the modified constant division information for the constant "0×12345678". In the figure, the subconstant use operation address information 606 is changed to addresses 0×80000000.0 and 0×80000004.0 as a result of adding absolute address 0×80000000 to each of relative addresses 0×0000.0 and 0×0004.0.

FIG. 17B shows the modified constant division information for identifier _a. In the figure, the constant value information 602 is changed from "_a" to "0×00001000", while the subconstant use operation address information 606 is changed from relative addresses 0×0008.0 and 0×000C.0 to absolute addresses 0×80000008.0 and 0×8000000C.0.

FIG. 17C shows the modified constant division information for identifier _b. In the figure, the constant value information 602 is changed from "_b" to "0×00001004", while the subconstant use operation address information 606 is changed from relative addresses 0×0010.0, 0×0014.1, and 0×0018.1 to absolute addresses 0×80000010.0, 0×80000014.1, and 0×80000018.1.

With the above embodiment, a mnemonic code can be displayed with the original constant instead of the subconstant using the constant restore function of the debug aid device. Accordingly, the programmer can easily understand the program contents. Also, when constant division information does not generated in the program compiler device, the debug aid device can restore the original constant using execution history information and adjacent execution codes. Thus, it is possible to restore the original constant in debug target programs generated by conventional program compiler devices. Especially, the correct original constant can be restored using the execution history information even when a branch instruction is included in constant-related operations for the original constant. Also, by generating constant division information in the debug stage, the original constant can be restored at high speed next time. Also, the execution history information can be deleted once the constant division information is generated.

Also, with the constant restore function of the debug aid device, the programmer can easily change execution codes without knowing that the original constant has been divided into subconstants.

While shift and store operations are used as the constant-related operations in the present embodiment, branch operations may also be used.

While the original constant is divided into two consecutive addresses in the present embodiment, it may also be divided into three or more addresses that are not consecutive.

While the debugging is executed by inputting the debug command or by using the pointing device such as the mouse in the present embodiment, other input devices, such as a trackball, a touch panel, and a light-pen, may instead be used.

While a group of constant-related operations that relate to the same constant is color-coded on the display in order to distinguish it from other operations in the present embodiment, a different display method may be used, such as displaying-in a unique typeface, adding a unique symbol, or underlining.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A debug aid device for supporting a debugging of an execution code sequence loaded in a memory, comprising:
    reception means for receiving a specification of a debug target address from a user;
    conversion means for converting an operation code in an execution code loaded in the debug target address in the memory to a mnemonic code;
    judgement means for judging, when the execution code includes a constant operand, whether the constant operand is a subconstant obtained by dividing a long-word constant;
    restoration means for restoring the long-word constant from the constant operand when the constant operand is the subconstant; and
    display means for displaying the mnemonic code with the long-word constant.

2. The debug aid device of claim 1, further comprising constant division information storage means for storing a plurality of sets of constant division information generated when a source code sequence was compiled to the execution code sequence,
    wherein each set of constant division information shows one of a plurality of long-word constants written in the source code sequence and a plurality of subconstants obtained by dividing the long-word constant,
    wherein the judgement means includes
    a first detection unit for detecting, from the constant division information storage means, a set of constant division information showing the subconstant that matches the constant operand included in the execution code, and
    wherein the restoration means restores the long-word constant by reading the long-word constant from the detected set of constant division information.

3. The debug aid device of claim 2,
    wherein each set of constant division information includes bit position information showing a position and a length of each of the plurality of subconstants in the long-word constant,
    wherein the first detection unit retrieves a plurality of subconstants from each long-word constant according to the bit position information included in each set of constant division information and judges whether the constant operand matches any of the plurality of retrieved subconstants, and
    wherein the restoration means restores the long-word constant by reading the long-word constant from the set of constant division information when the constant operand matches any of the plurality of retrieved subconstants.

4. The debug aid device of claim 3,
    wherein each set of constant division information shows a load address of each execution code that includes one of the plurality of subconstants when the load address is known,
    wherein the judgement means includes
    a second detection unit for detecting, when there are at least two sets of constant division information which each show the subconstant that matches the constant operand, a set of constant division information, among the sets of constant division information, which shows a load address that matches the debug target address, and
    wherein, when the second detection unit detects the set of constant division information, the restoration means restores the long-word constant by reading the long-word constant from the detected set of constant division information.

5. The debug aid device of claim 4,
    wherein the reception means includes
    a change command reception unit for receiving a command for changing a long-word constant in the memory and a new long-word constant from the user, and
    wherein the debug aid device further comprises:
    division means for dividing the new long-word constant into a plurality of new subconstants according to the bit position information in a set of constant division information that shows the long-word constant to be changed; and
    write means for writing each of the plurality of new subconstants into a corresponding load address shown in the set of constant division information.

6. The debug aid device of claim 2,
    wherein each set of constant division information includes type information for showing whether the long-word constant is expressed as a number or an identifier which identifies the long-word constant in the source code sequence and shows one of the number and the identifier according to the type information, and
    wherein the display means includes:
    a judgement unit for judging, when the constant operand is the subconstant, whether the long-word constant is expressed as a number or an identifier in the source code sequence with reference to the type information in the set of constant division information that shows the subconstant;
    a first display unit for displaying the identifier shown in the set of constant division information when the long-word constant is expressed as the identifier; and a second display unit for displaying the number shown in the set of constant division information when the long-word constant is expressed as the number.

7. The debug aid device of claim 2, wherein the reception means includes a list command reception unit for receiving a list display command and a specification of a list display address range from the user, wherein the conversion means converts a plurality of operation codes in a plurality of execution codes loaded in the list display address range in the memory to a plurality of mnemonic codes, wherein the judgement means judges for execution codes, among the plurality of execution codes, that each include a constant operand whether the constant operand is a subconstant obtained by dividing a long-word constant, wherein the restoration means replaces the constant operand that is the subconstant with the long-word constant, and wherein, among the plurality of mnemonic codes, the display means displays mnemonic codes corresponding to the execution codes in which the constant operand is replaced with the long-word constant in a different mode from other mnemonic codes.

8. The debug aid device of claim 1, wherein the restoration means includes:

a bit length calculation unit for calculating a difference bit length by subtracting a bit length of the constant operand included in the execution code from a standard bit length of the long-word constant;

an execution code detection unit for detecting at least one constant operand that has a bit length no more than the difference bit length from addresses adjacent to the debug target address; and an arrangement unit for arranging the detected constant operand and the constant operand included in the debug target address to restore the long-word constant.

9. The debug aid device of claim 8, wherein the arrangement unit includes:

a first arrangement unit for arranging, when a constant operand that has a bit length equal to the difference bit length is detected, the detected constant operand and the constant operand included in the debug target address in order to restore the long-word constant; and a second arrangement unit for arranging, when at least two constant operands that each have a bit length less than the difference bit length and that have a total bit length equal to the difference bit length are detected, the detected constant operands and the constant operand included in the debug target address in order to restore the long-word constant, and wherein the display means displays the mnemonic code with the long-word constant restored by one of the first arrangement unit and the second arrangement unit.

10. The debug aid device of claim 9, further comprising execution history storage means for storing, when at least one execution code loaded in the memory has been executed, addresses of the executed execution code, wherein, when no execution code has been executed, the execution code detection unit detects the constant operand from the addresses adjacent to the debug target address, and wherein, when at least one execution code has been executed, the execution code detection unit detects the constant operand from the addresses stored in the execution history storage means and from the addresses adjacent to the debug target address.

11. The debug aid device of claim 10, further comprising:

constant division information storage means for storing a plurality of sets of constant division information, wherein each set of constant division information shows: one of a plurality of long-word constants written in a source code sequence which has been compiled to the execution code sequence; subconstant information showing a plurality of subconstants obtained by dividing the long-word constant; and a load address of each execution code that includes one of the plurality of subconstants when the load address is known; and constant division information generation means for generating, when the long-word constant is restored by the arrangement unit, a set of constant division information by writing the restored long-word constant as an original long-word constant, writing the detected constant operand and the constant operand included in the debug target address as the subconstant information, and writing the debug target address and an address of the detected constant operand as load addresses, wherein the generated set of constant division information is stored into the constant division information storage means.

12. The debug aid device of claim 1, wherein the execution code sequence loaded in the memory includes operation sequences, wherein each operation sequence is made up of at least one constant store operation and a constant use operation, wherein a processor corresponding to the debug aid device includes:

read means for reading an operation included in any of the operation sequences from the memory;

analysis means for analyzing whether the read operation is a constant store operation or a constant use operation;

a constant register for storing subconstants;

storage means for storing, when the read operation is the constant store operation and when no subconstant is stored in the constant register, a subconstant included in the operation into the constant register, and for storing, when the read operation is the constant store operation and when the constant register stores at least one subconstant, the subconstant included in the operation into the constant register; and execution means for reading, when the read operation is the constant use operation, all subconstants stored in the constant register and executing the operation using the read subconstants as operands.

13. The debug aid device of claim 12, wherein the processor is a VLIW processor for executing a plurality of operations in parallel which are included in one instruction.

14. A program compiler device, comprising:

reception means for receiving a command for compiling a source code sequence from a user;

compilation means for compiling the source code sequence to an execution code sequence when the command for compiling the source code sequence is received, wherein, among all instructions written in the source code sequence, each instruction that includes a long-word constant is replaced with an operation sequence in the execution code sequence, the operation sequence being made up of a plurality of operations that respectively include a plurality of subconstants obtained by dividing the long-word constant;

judgement means for judging whether the command for compiling the source code sequence is accompanied with a debug option specification; and generation means for generating constant division information for specifying the long-word constant using the plurality of subconstants when the debug option specification is accompanied.

15. The program compiler device of claim 14, wherein the constant division information includes a load address column showing a load address of each of the plurality of operations that respectively include the plurality of subconstants, wherein the compilation means includes:

a replacement unit for replacing each instruction that includes the long-word constant with the operation sequence made up of the plurality of operations;

an optimization unit for optimizing the source code sequence in which each instruction has been replaced with the operation sequence; and an assignment unit for assigning a load address in a target machine to each of the plurality of operations in the optimized source code sequence, and wherein the generation means includes:

a write unit for calculating, after each instruction is replaced with the operation sequence, a relative address of each operation included in the operation sequence and writing the relative address into the load address column in the constant division information; and a renewal unit for renewing the relative address according to a change of the relative address as a result of an optimization by the optimization unit, calculating a load address from the renewed relative address and the assigned load address, and writing the calculated load address into the load address column in the constant division information.

16. The program compiler device of claim 14, wherein the long-word constant is expressed as one of a number and an identifier which identifies the long-word constant in the source code sequence, wherein the constant division information includes a constant type column showing whether the long-word constant is expressed as the number or the identifier, wherein, if the long-word constant is expressed as the identifier, a number is assigned to the long-word constant when a load address in a target machine is assigned to each of the plurality of operations, and wherein the generation means includes:

a first detection unit for detecting, if the long-word constant is expressed as the identifier, the long-word constant from the source code sequence, writing the detected long-word constant into the constant division information, and writing information that the long-word constant is expressed as the identifier into the constant type column in the constant division information;

a second detection unit for detecting, if the long-word constant is expressed as the number, the long-word constant from the source code sequence, writing the detected long-word constant into the constant division information, and writing information that the long-word constant is expressed as the number into the constant type column in the constant division information; and a write unit for writing, when the number is assigned to the long-word constant expressed as the identifier, the assigned number into the constant division information.

17. A computer-readable storage medium that stores a debugger program for supporting a debugging of an execution code sequence loaded in a memory, the debugger program comprising:

a reception step of receiving a specification of a debug target address from a user;

a conversion step of converting an operation code in an execution code loaded in the debug target address in the memory to a mnemonic code;

a judgement step of judging, when the execution code includes a constant operand, whether the constant operand is a subconstant obtained by dividing a long-word constant;

a restoration step of restoring the long-word constant from the constant operand when the constant operand is the subconstant; and a display step of displaying the mnemonic code with the long-word constant.

18. The storage medium of claim 17, including a constant division information storage area that stores a plurality of sets of constant division information generated when a source code sequence was compiled to the execution code sequence, wherein each set of constant division information shows one of a plurality of long-word constants written in the source code sequence and a plurality of subconstants obtained by dividing the long-word constant, wherein the judgement step includes a first detection substep of detecting, from the constant division information storage area, a set of constant division information showing the subconstant that matches the constant operand included in the execution code, and wherein the restoration step restores the long-word constant by reading the long-word constant from the detected set of constant division information.

19. The storage medium of claim 18, wherein each set of constant division information includes bit position information showing a position and a length of each of the plurality of subconstants in the long-word constant, wherein the first detection substep retrieves a plurality of subconstants from each long-word constant according to the bit position information included in each set of constant division information and judges whether the constant operand matches any of the plurality of retrieved subconstants, and wherein the restoration step restores the long-word constant by reading the long-word constant from the set of constant division information when the constant operand matches any of the plurality of retrieved subconstants.

20. The storage medium of claim 19, wherein each set of constant division information shows a load address of each execution code that includes one of the plurality of subconstants when the load address is known, wherein the judgement step includes a second detection substep of detecting, when there are at least two sets of constant division information which each show the subconstant that matches the constant operand, a set of constant division information, among the sets of constant division information, which shows a load address that matches the debug target address, and wherein, when the second detection substep detects the set of constant division information, the restoration step restores the long-word constant by reading the long-word constant from the detected set of constant division information.

21. The storage medium of claim 20, wherein the reception step includes a change command reception substep of receiving a command for changing a long-word constant in the memory and a new long-word constant from the user, and wherein the debugger program further comprises:

a division step of dividing the new long-word constant into a plurality of new subconstants according to the bit position information in a set of constant division information that shows the long-word constant to be changed; and a write step of writing each of the plurality of new subconstants into a corresponding load address shown in the set of constant division information.

22. The storage medium of claim 18, wherein each set of constant division information includes type information for showing whether the long-word constant is expressed as a number or an identifier which identifies the long-word constant in the source code sequence and shows one of the number and the identifier according to the type information, and wherein the display step includes:

a judgement substep of judging, when the constant operand is the subconstant, whether the long-word constant is expressed as a number or an identifier in the source code sequence with reference to the type information in the set of constant division information that shows the subconstant;

a first display substep of displaying the identifier shown in the set of constant division information when the long-word constant is expressed as the identifier; and a second display substep of displaying the number shown in the set of constant division information when the long-word constant is expressed as the number.

23. The storage medium of claim 18, wherein the reception step includes a list command reception substep of receiving a list display command and a specification of a list display address range from the user, wherein the conversion step converts a plurality of operation codes in a plurality of execution codes loaded in the list display address range in the memory to a plurality of mnemonic codes, wherein the judgement step judges for execution codes, among the plurality of execution codes, that each include a constant operand whether the constant operand is a subconstant obtained by dividing a long-word constant, wherein the restoration step replaces the constant operand that is the subconstant with the long-word constant, and wherein, among the plurality of mnemonic codes, the display step displays mnemonic codes corresponding to the execution codes in which the constant operand is replaced with the long-word constant in a different mode from other mnemonic codes.

24. The storage medium of claim 17, wherein the restoration step includes:

a bit length calculation substep of calculating a difference bit length by subtracting a bit length of the constant operand included in the execution code from a standard bit length of the long-word constant;

an execution code detection substep of detecting at least one constant operand that has a bit length no more than the difference bit length from addresses adjacent to the debug target address; and an arrangement substep of arranging the detected constant operand and the constant operand included in the debug target address to restore the long-word constant.

25. The storage medium of claim 24, wherein the arrangement substep includes:

a first arrangement substep of arranging, when a constant operand that has a bit length equal to the difference bit length is detected, the detected constant operand and the constant operand included in the debug target address in order to restore the long-word constant; and a second arrangement substep of arranging, when at least two constant operands that each have a bit length less than the difference bit length and that have a total bit length equal to the difference bit length are detected, the detected constant operands and the constant operand included in the debug target address in order to restore the long-word constant, and wherein the display step displays the mnemonic code with the long-word constant restored in one of the first arrangement substep and the second arrangement substep.

26. The storage medium of claim 25, wherein, when no execution code in the execution code sequence has been executed, the execution code detection substep detects the constant operand from the addresses adjacent to the debug target address, and wherein, when at least one execution code has been executed, the execution code detection substep detects the constant operand from addresses of the execution codes which have been executed and from the addresses adjacent to the debug target address.

27. The storage medium of claim 26, further including a constant division information storage area that stores a plurality of sets of constant division information, wherein each set of constant division information shows: one of a plurality of long-word constants written in a source code sequence which has been compiled to the execution code sequence; subconstant information showing a plurality of subconstants obtained by dividing the long-word constant when the source code sequence has been compiled to the execution code sequence; and a load address of each execution code that includes one of the plurality of subconstants when the load address is known, wherein the debugger program further comprises a constant division information generation substep of generating, when the long-word constant is restored in the arrangement step, a set of constant division information by writing the restored long-word constant as an original long-word constant, writing the detected constant operand and the constant operand included in the debug target address as the subconstant information, and writing the debug target address and an address of the detected constant operand as load addresses, and wherein the generated set of constant division information is stored into the constant division information storage area.

28. A computer-readable storage medium that stores a program compiler program, the program compiler program comprising:

a reception step of receiving a command for compiling a source code sequence from a user;

a compilation step of compiling the source code sequence to an execution code sequence when the command for compiling the source code sequence is received, wherein, among all instructions written in the source code sequence, each instruction that includes a long-word constant is replaced with an operation sequence in the execution code sequence, the operation sequence being made up of a plurality of operations that respectively include a plurality of subconstants obtained by dividing the long-word constant;

a judgement step of judging whether the command for compiling the source code sequence is accompanied with a debug option specification; and a generation step of generating constant division information for specifying the long-word constant using the plurality of subconstants when the debug option specification is accompanied.

29. The storage medium of claim 28, wherein the constant division information includes a load address column showing a load address of each of the plurality of operations that respectively include the plurality of subconstants, wherein the compilation step includes:

a replacement substep of replacing each instruction that includes the long-word constant with the operation sequence made up of the plurality of operations;

an optimization substep of optimizing the source code sequence in which each instruction has been replaced with the operation sequence; and an assignment substep of assigning a load address in a target machine to each of the plurality of operations in the optimized source code sequence, and wherein the generation step includes:

a write substep of calculating, after each instruction is replaced with the operation sequence, a relative address of each operation included in the operation sequence and writing the relative address into the load address column in the constant division information; and a renewal substep of renewing the relative address according to a change of the relative address as a result of an optimization in the optimization substep, calculating a load address from the renewed relative address and the assigned load address, and writing the calculated load address into the load address column in the constant division information.

30. The storage medium of claim 28, wherein the long-word constant is expressed as one of a number and an identifier which identifies the long-word constant in the source code sequence, wherein the constant division information includes a constant type column showing whether the long-word constant is expressed as the number or the identifier, wherein, if the long-word constant is expressed as the identifier, a number is assigned to the long-word constant when a load address in a target machine is assigned to each of the plurality of operations, and wherein the generation step includes:

a first detection substep of detecting, if the long-word constant is expressed as the identifier, the long-word constant from the source code sequence, writing the detected long-word constant into the constant division information, and writing information that the long-word constant is expressed as the identifier into the constant type column in the constant division information;

a second detection substep of detecting, if the long-word constant is expressed as the number, the long-word constant from the source code sequence, writing the detected long-word constant into the constant division information, and writing information that the long-word constant is expressed as the number into the constant type colum n in the constant division information; and a write substep of writing, when the number is assigned to the long-word constant expressed as the identifier, the assigned number into the constant division information.

* * * * *